United States Patent [19]
Kallin et al.

[11] Patent Number: 5,274,567
[45] Date of Patent: Dec. 28, 1993

[54] TABLE TOP IMAGE BASED DOCUMENT PROCESSING MACHINE AND METHODS OF PROCESSING DOCUMENTS

[75] Inventors: Fredrik L. N. Kallin, Waterloo; Graham Luckhurst, Kitchener; Richard T. Pierce, Waterloo; Jerry D. James, Cambridge; Guy J. Fries, Waterloo, all of Canada

[73] Assignee: NCR Corporation, Dayton, Ohio

[21] Appl. No.: 634,672

[22] Filed: Dec. 27, 1990

[51] Int. Cl.⁵ .................... G06F 15/20; G06F 15/30
[52] U.S. Cl. .................... 364/478; 364/401; 364/406; 364/408; 235/379; 235/477; 235/480; 382/7; 382/62
[58] Field of Search ............ 235/379, 384, 480, 477; 382/7, 62, 64, 67, 48, 61; 400/82, 188, 625, 73, 636, 578, 583; 364/478, 469, 401, 406-408; 283/62, 58, 70, 67

[56] References Cited
U.S. PATENT DOCUMENTS

| | | | |
|---|---|---|---|
| 3,988,571 | 10/1976 | Blair et al. | 235/379 |
| 4,201,978 | 5/1980 | Nally . | |
| 4,264,808 | 4/1981 | Owens et al. | 235/379 |
| 4,385,285 | 5/1983 | Horst et al. . | |
| 4,513,393 | 4/1985 | Edlund et al. | 364/408 |
| 4,604,696 | 8/1986 | Suganuma et al. | 364/401 |
| 4,608,485 | 8/1986 | Miura | 235/379 |
| 4,608,488 | 8/1986 | Hirose et al. | 235/384 |
| 4,677,551 | 6/1987 | Suganuma | 364/401 |
| 4,731,524 | 3/1988 | Brooks | 235/379 |
| 4,733,060 | 3/1988 | Dono et al. | 235/379 |
| 4,888,812 | 12/1989 | Dinan et al. | 382/7 |
| 4,992,647 | 2/1991 | Konishi et al. | 235/379 |
| 5,001,769 | 3/1991 | Reid-Green et al. | 382/48 |
| 5,021,967 | 6/1991 | Smith | 235/379 |
| 5,053,607 | 10/1991 | Carlson et al. | 235/379 |
| 5,053,955 | 10/1991 | Peach et al. | 364/401 |
| 5,060,980 | 10/1991 | Johnson et al. | 282/70 |

Primary Examiner—Jerry Smith
Assistant Examiner—Steven R. Garland
Attorney, Agent, or Firm—Elmer Wargo

[57] ABSTRACT

A table top image based document processing machine and methods of using it. The machine is used in conjunction with a host computer like a PC. The machine includes a document track, a programmable transport mechanism for moving the document bi-directionally within the track, front and back imagers for imaging the front and rear of the document, front and back printers for endorsing data on the front and the back of the document, a magnetic card reader module, an encryption module and a MICR printer for encoding MICR data on the front of the document, for example. The machine in conjunction with the PC can be used for generating Logos, creating checks, performing remittance processing, imaging and reading checks, truncation processing, lockbox operations, and the usual bank teller operations.

57 Claims, 13 Drawing Sheets

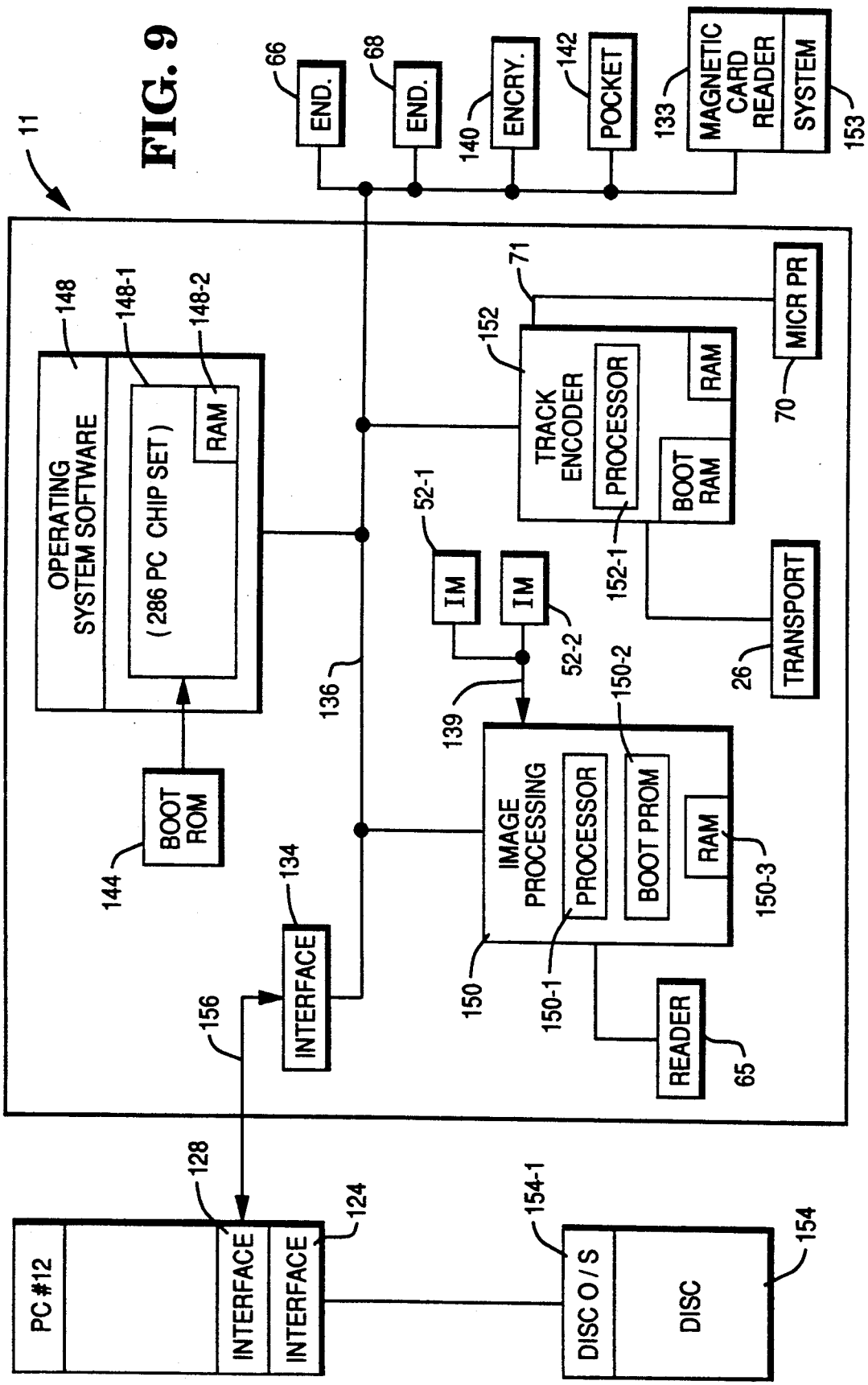

TABLE TOP IMAGE BASED DOCUMENT PROCESSING MACHINE AND METHODS OF PROCESSING DOCUMENTS

BACKGROUND OF THE INVENTION (1) Field of the Invention

This invention relates to an image based document processing machine and methods of processing documents using this machine.

(2) Background Information

One of the problems with present document processing machines like those used by a bank teller, for example, is that many different pieces of equipment are needed to perform bank teller functions. For example, some of the equipment used may include a line code reader, endorsement stamps, an encoder, typewriter, receipt/slip printer, and microfilmer. It is apparent that with so many pieces of equipment on a counter top, a teller's station becomes quite cluttered, and some of the functions of the equipment tend to be duplicated. Another problem is that all these pieces of equipment tend to occupy a large area or have a large "footprint".

SUMMARY OF THE INVENTION

An object of this invention is to provide a document processing machine which can provide a number of functions which can be packaged into a machine which has a small "footprint" so as to enable it to be operated from a counter top. While a preferred embodiment of this invention will be discussed relative to the processing of financial documents, the machine and methods of this invention can be utilized in other activities such as the processing of aircraft boarding passes, remittance processing, handling traffic tickets, wholesale "lockbox functions", and the processing of library cards, for example.

The document processing machine utilizes a document transport having a feeding direction which is bi-directional which facilitates providing a small footprint for the machine.

The document processing machine is designed to be totally "soft". In other words, the operating system embedded controller software, reader algorithms, print fonts, and application programs are stored in a computer, like a personal computer (PC), and not in a chip set within the machine itself. This means that new software features are automatically downloaded when the PC and the machine are powered up. Encoding fonts and read fonts are also downloaded on "power up" and can be changed at any time.

In one aspect of this invention, there is provided a document processing machine for use with a computer having a keyboard, display, and control means for controlling the operation of said computer; said document processing machine being used for processing a document having a first side and a second side, said document processing machine comprising:

a document track having a first end and a second end with said first end being used for entering and exiting said document, and with said second end being used for exiting said document;

programmable transport means for moving said document along first and second feeding directions within said document track, with said first and second directions being towards said second and first ends, respectively;

imaging means for imaging one of said first and second sides as said document is moved along one of said first and second feeding directions in imaging relationship with said imaging means;

a printer positioned along said document track for printing on one of said first and second sides of said document;

a control board operatively coupled to said transport means, imaging means, and printer, and input means for coupling said control board to said control means of said computer.

In another aspect of this invention, there is provided a method of processing a document having first and second sides in a document processing machine (hereinafter referred to as machine) which is controlled by a computer having a keyboard, display, storing means for storing data, and control means for controlling the computer; said machine having a document track; programmable transport means for moving said document bi-directionally along opposed feeding directions in said document track; imaging means for imaging at least one of said first and second sides; at least one printer for printing on one of said first and second sides; and an operating system coupled to said control means, said programmable transport means, said imaging means, and said at least one printer; said method comprising the steps of:

(a) loading in said control means programs to control the operation of the machine;

(b) positioning a document to be processed in said document track;

(c) inputting to said control means a control signal indicating the type of graphic to be printed on one of said first and second sides of said document; and (d) printing said graphic on said document by moving said document in printing relationship with said printer located adjacent to said document track.

There are numerous other features and advantages of this invention which will discussed at appropriate points during the detailed description of the invention.

The above advantages and others will be more readily understood in connection with the following description, claims, and drawing.

BRIEF DESCRIPTION OF THE DRAWING

FIG. 9 is a schematic diagram showing the electrical hardware associated with the operation of the machine shown in FIG. 1.

DESCRIPTION OF THE PREFERRED EMBODIMENT

Figure 1:
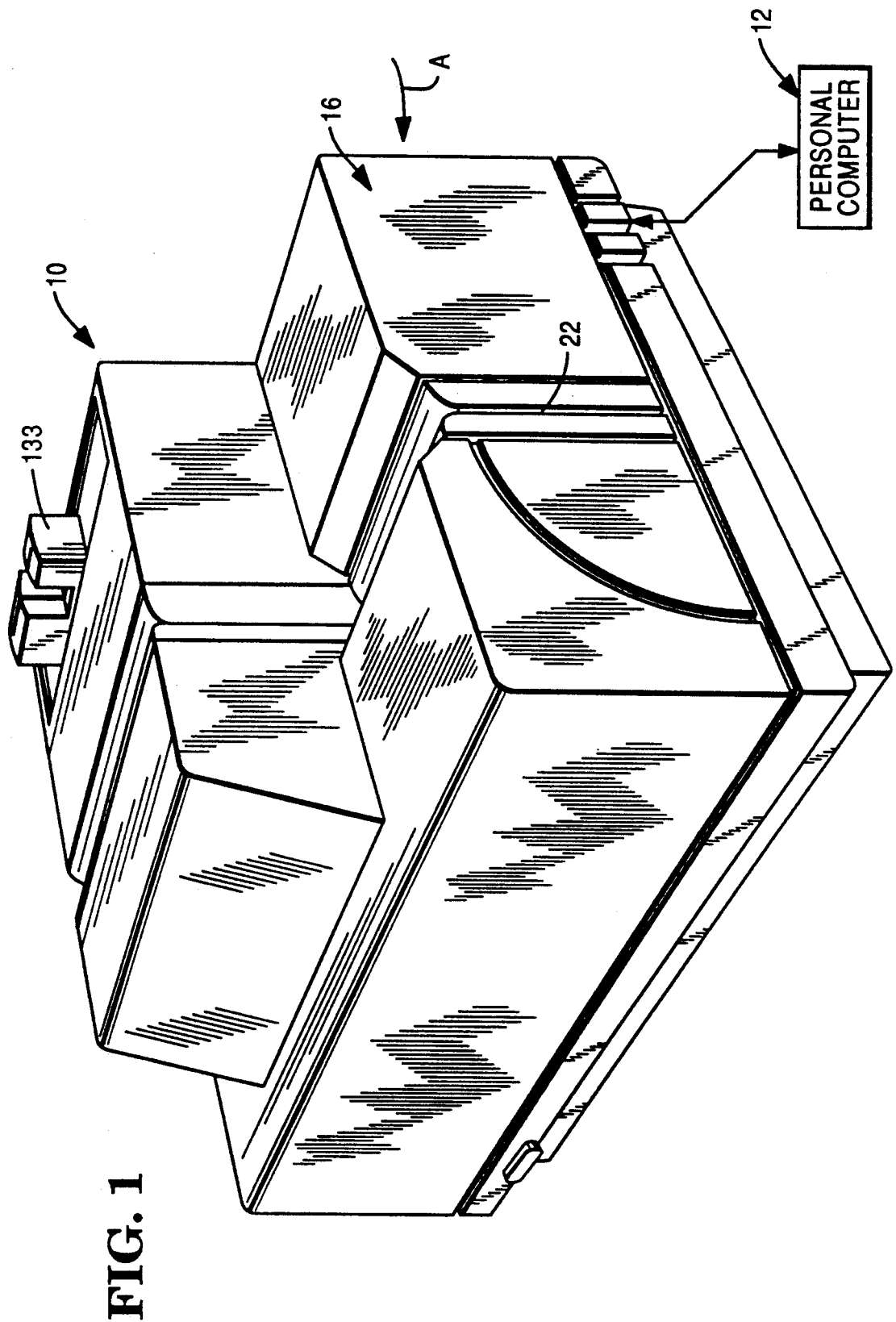
FIG. 1 is a general perspective view of a preferred embodiment of a document processing machine made according to this invention.

FIG. 1 is a general perspective view of a preferred embodiment of this invention, showing a document processing machine (hereinafter referred to as machine 10) made according to this invention. As stated earlier herein, the machine 10 will be discussed in relation to the processing of financial documents; it is especially useful in an environment in which a teller has a lot of processing to do when a check, for example, is received at a bank.

In general, the machine 10 is a low speed counter-top document processing machine. The machine 10 performs of number of different functions such as document imaging, optical character recognition, text and graphics printing using ink jet technology, for example, magnetic card reading, and thermal encoding to print MICR data on a document, like a bank check. All these features are combined in the machine 10 which has a very small footprint or size, making it easy to fit the machine 10 on a bank teller counter. Another feature of the machine 10 is that its construction is modular in design, making the machine conducive to tailoring the features included in a particular machine to a customer's requirements. The machine 10 operates as a peripheral to a computer, like a personal computer (PC 12), shown only schematically in FIG. 1, making it easily programmable by a customer working in MS-DOS, TM or OS/2 TM systems; these trademarks are owned by Microsoft and IBM, respectively.

Figure 2:
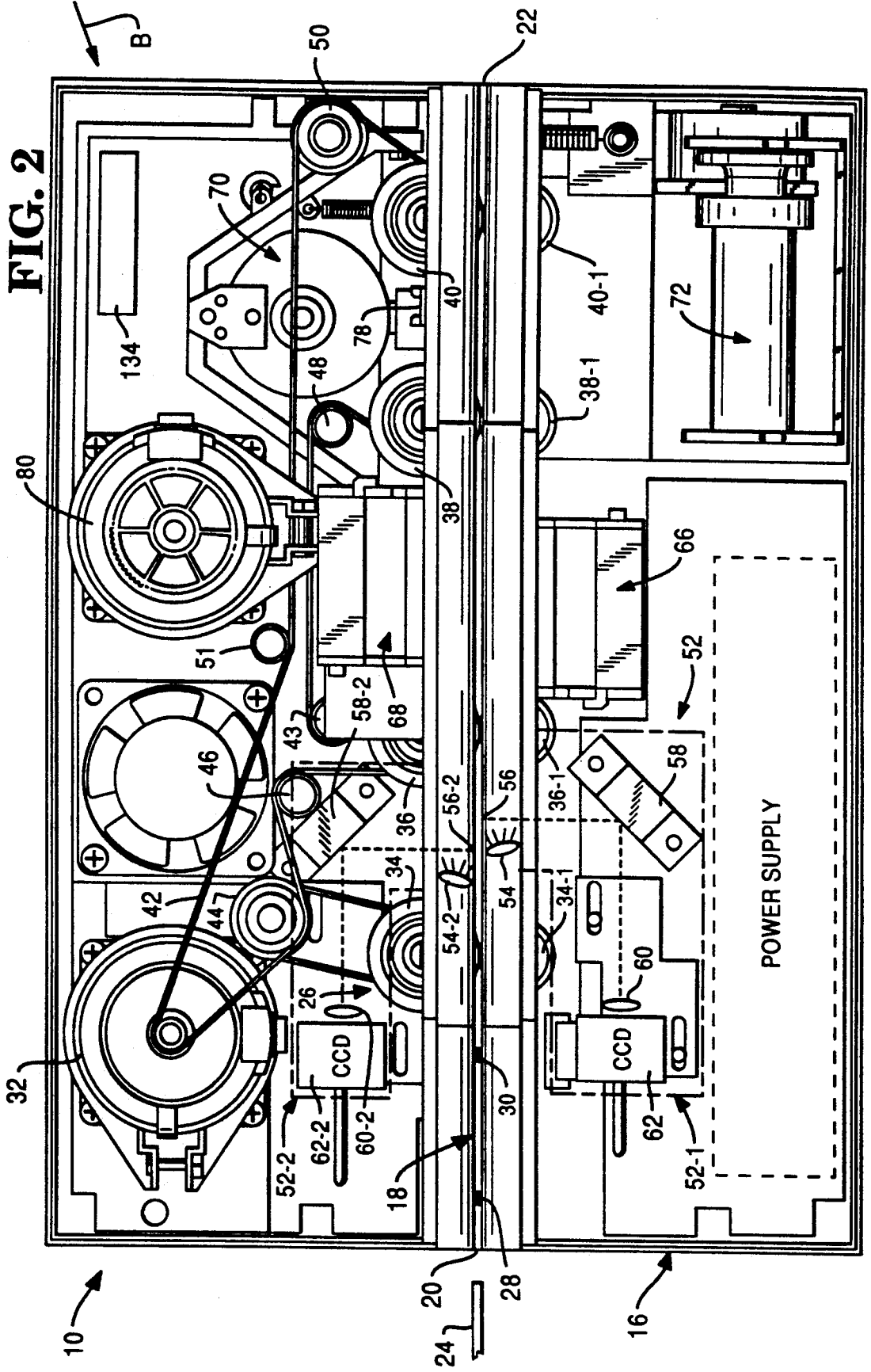
FIG. 2 is a plan view of the various elements included in the machine shown in FIG. 1 when the cover of the machine is removed.

The machine 10 (FIG. 1) has a metal chassis 14 (FIG. 3) which supports the various elements to be described and also includes a cabinet 16 to house these elements which are shown in plan view in FIG. 2.

The machine 10 (FIG. 2) includes a document track 18 having a first or an entrance area 20 and a second or an exit area 22. Entrance area 20 can also be used as an exit area for exiting documents. A document 24 to be entered into the machine 10 is manually positioned at the entrance area 20 and is moved into the document track 18 where transport means 26 are utilized to move the document 24 in a feeding direction in the document track 18, with the feeding direction being bi-directional. One feeding direction is directed from the entrance area 20 towards the exit area 22, and the other feeding direction is directed from the exit area 22 towards the entrance area 20. By having a feeding direction which is bi-directional, it is possible to make the machine 10 have a smaller footprint as discussed earlier herein. Typically, long document tracks are required when document processing elements are positioned along a document track which feeds documents in only one direction along the track.

The transport means 26 includes first and second sensors 28 and 30 (FIG. 2) which are positioned near the bottom of the track 18 to insure that the document 24 is properly positioned or de-skewed in the document track 18 prior to activating a stepper motor 32 which is also a part of the transport means 26. In other words, unless both sensors 28 and 30 are covered by a document 24 (indicating proper alignment), the stepper motor 32 will not be energized. The stepper motor 32 is coupled to several drive rollers 34, 36, 38, and 40 via a conventional timing belt 42 and idler rollers 43, 44, 46, 48, 50, and 51 as shown best in FIG. 3. Suitable pinch rollers 34-1, 36-1, 38-1, and 40-1 are positioned opposite to drive rollers 34, 36, 38, and 40, respectively, to cooperate therewith to move the document 24 in the feeding directions mentioned, depending upon how the reversible stepper motor 32 is energized. As viewed in FIG. 2., the top long side of the document 24 is visible, and the bottom long side thereof contacts the bottom the document track 18. With the transport means 26 described, a document 24 may be exited from the machine 10 at the exit area 22, or, after entry into the machine 10 at entrance area 20, the document may also be exited from the entrance area 20. This is a feature of the machine 10.

The machine 10 also includes an imaging means 52 (shown schematically in FIG. 2) for imaging the document 24 as it is moved along the document track 18 by the transport means 26. The imaging means 52 includes a first imager 52-1 for imaging the first or front side of the document 24 and a second imager 52-2 for imaging the second or rear side thereof. The first imager 52-1 includes a light source 54 for illuminating a scanning line 56 which extends over the entire height of a document 24, which in the embodiment described, is four inches. The light reflected from the document 24 at the scanning line 56 is reflected from a mirror 58 and passes through a reduction lens 60 to impinge upon a charge coupled device (CCD) 62. In the embodiment described, the transport means 26 moves the document 24 past the scanning line 56 at a speed of about 6 inches per second, although other speeds may be used for different applications. The picture elements or "pixels" coming from the scanning line of a CCD 62 may be processed and digitized conventionally so as to enable them to be stored in a memory or displayed on a display 64 (FIG. 5) associated with the PC 12. The image resulting from the pixels may be read or recognized utilizing read algorithms that are down loaded on power-up. This function is controlled by an operating system to be later described herein in relation to FIG. 6, for example.

The second imager 52-2 FIG. 2) is identical to the imager 52-1 already described; however, the imager 52-2 is positioned on the opposite side of the document track 18 so as to image the second or rear side of the document 24. The second imager 52-2 has a light source 54-2, scanning line 56-2, mirror 58-2, reduction lens 60-2, and CCD 62-2 which function in the same manner as the corresponding elements already described in relation to the first imager 52-1. In the embodiment described, the first side of the document 24 is imaged as the document 24 is moved in a feeding direction towards the exit area 22, and thereafter, the second or rear side of the document 24 is imaged by reversing the direction of the stepper motor 32 so as to move the document in a feeding direction towards the entrance area 20. These feeding directions mentioned are simply typical, and these directions can be programmed to suit particular applications. This bi-direction feeding of a document is one of the features of this invention which facilitates designing the machine with a small footprint and also facilitates the printing of graphics, for example, on the document 24.

The machine 10 also includes a printer or front endorser 66 which prints on the first or front side of the document 24, and it also may include a rear printer or endorser 68 which prints on the rear side of the document 24. In the embodiment described, the endorsers 66 and 68 are ink jet printers so as to enable the machine 10 to print graphics in addition to alphanumerics on both the front and rear sides of the document 24. In the embodiment described, the endorsers 66 and 68 each contain a printer like the Hewlett Packard "Thinkjet" print head #51616A which is a thermally driven ink jet type printer. As seen best in FIG. 3, the endorser 68 has a frame 68-1 and a print head 68-2 which is mounted on a carriage 68-3. The carriage 68-3 is moveably mounted in the frame 68-1 (secured to the chassis 14) to enable the print head 68-2 to be moved bi-directionally in a vertical direction as viewed in FIG. 3. The carriage 68-3, with the print head 68-2 thereon, is moved by a pulley 68-4 having a cable 68-5 wound thereon, with this cable being secured to the carriage 68-3. The pulley 68-4 is bi-directionally rotated by a stepper motor 68-6 to enable the print head 68-2 to be moved up and down relative to a document located in the document track 18. Because the transport means 26 is bi-directional, and because the print head 68-2 can be reciprocated or shuttled along a direction which is perpendicular to the feeding directions of a document 24 being moved through the document track 18, alpha-numeric characters and graphics may be printed on the document 24 by the endorser 68. This is a feature of the machine 10. In the embodiment described, the print head 68-2 is a replaceable ink jet printer which includes its own ink supply.

The endorser 66, located on the front of the machine 10, is identical in construction to the endorser 68 just described. This is another feature of the machine 10 in that alpha-numeric characters and graphics may be printed on the front of a document 24. Being able to print on both the front and back of a document 24 as described presents opportunities for processing documents, creating forms of different kinds, preparing checks, preparing deposit tickets, and preparing library check-out slips, for example, to name just a few uses for the machine 10. Software and a control means 11 (shown generally in FIG. 5), to operate the machine 10 to effect the various functions discussed, will be described hereinafter.

The machine 10 also includes an encoder or a printer 70 (FIG. 2) which is used to print MICR data on the front of a document 24 when that document is a check, for example. E13B, CMC7, and OCR fonts can be printed, depending upon which font has been downloaded to the machine 10. In order to print with the printer 70, a document 24 is moved by the transport means 26 in the document track 18 to be aligned with the printer 70, and the document is held at the printer 70 by the drive rollers 38 and 40 and their associated pinch rollers 38-1 and 40-1 as seen best in FIG. 2. A ribbon supply means 72 is used to provide a supply of thermally active MICR ribbon 74, shown schematically in FIG. 7.

Figure 3:
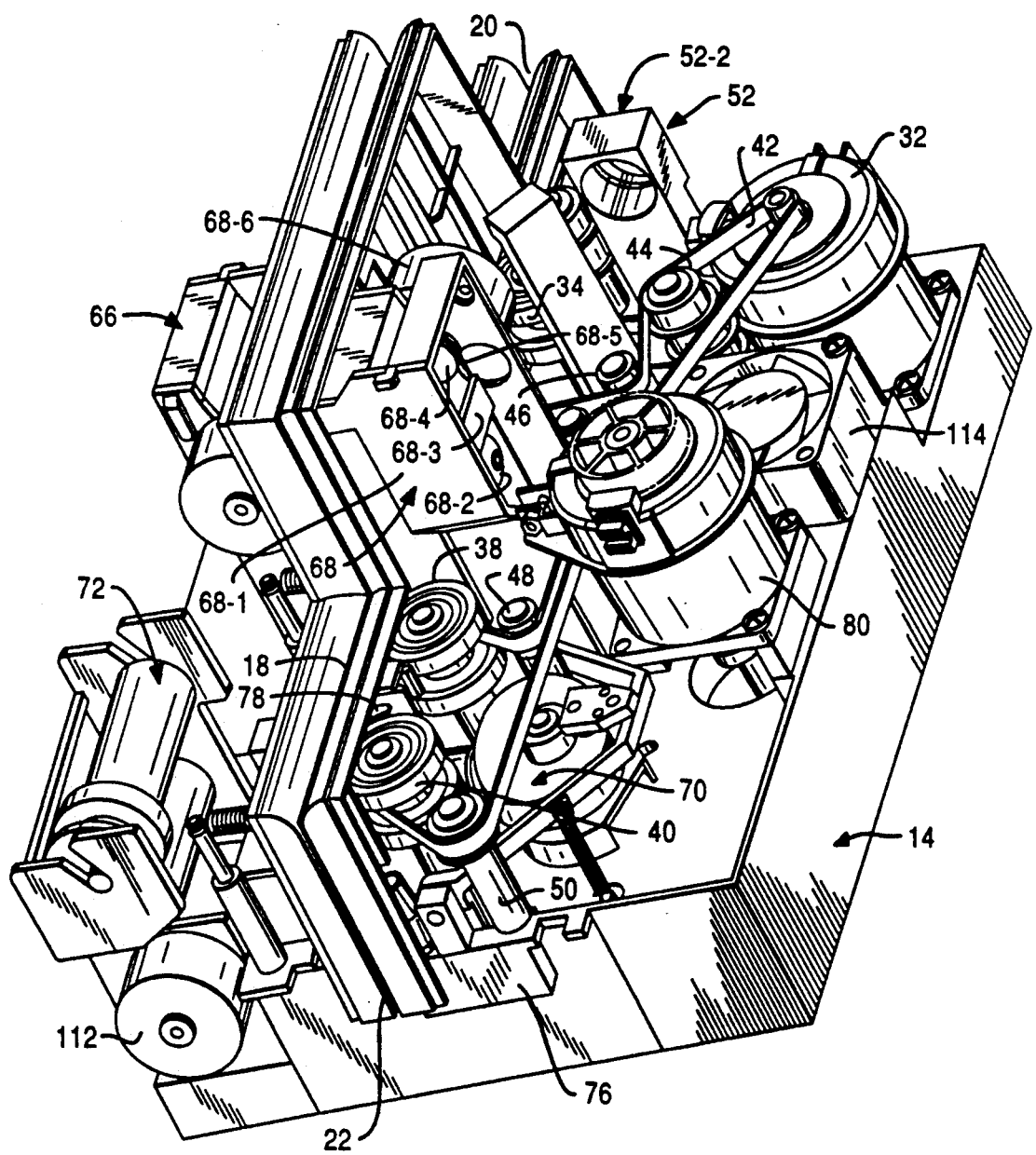
FIG. 3 is a general isometric view of the machine shown in FIG. 2 when viewing it from the general direction of arrow A in FIG. 1.

The printer 70 is mounted on a baseplate 76, which in turn, is mounted on the chassis 14 shown in FIG. 3. The operation of the printer 70 is controlled by the control means 11 to be later described herein. For the moment, assume that only printing or encoding is to be performed on a document hand dropped in the document track 18. After the document 24 is properly aligned in the document track 18 in relation to the first and second sensors 28 and 30 as previously described, the document is moved to the right (as viewed in FIG. 2) by the transport means 26 until the leading edge of the document 24 reaches a document registration detector or sensor 78 (FIG. 3). A signal from the sensor 78 is used by the control means 11 to control the stepper motor 32 so that the document 24 is properly positioned in printing relationship with the printer 70. A feature of this invention is that one stepper motor 32 is used to move a document within the document track 18 and is also used to position the document at the printer 70 and endorsers 66 and 68.

After the document 24 is positioned at the printer 70 (FIG. 2), a stepper motor 80 is energized to begin the printing process. When the stepper motor 80 is energized, it rotates a shaft 82 clockwise, as viewed in FIG. 7, to rotate a cam 84 which provides the movement to effect the printing. In the embodiment described, the printer 70 is a thermal printer.

Figure 7:
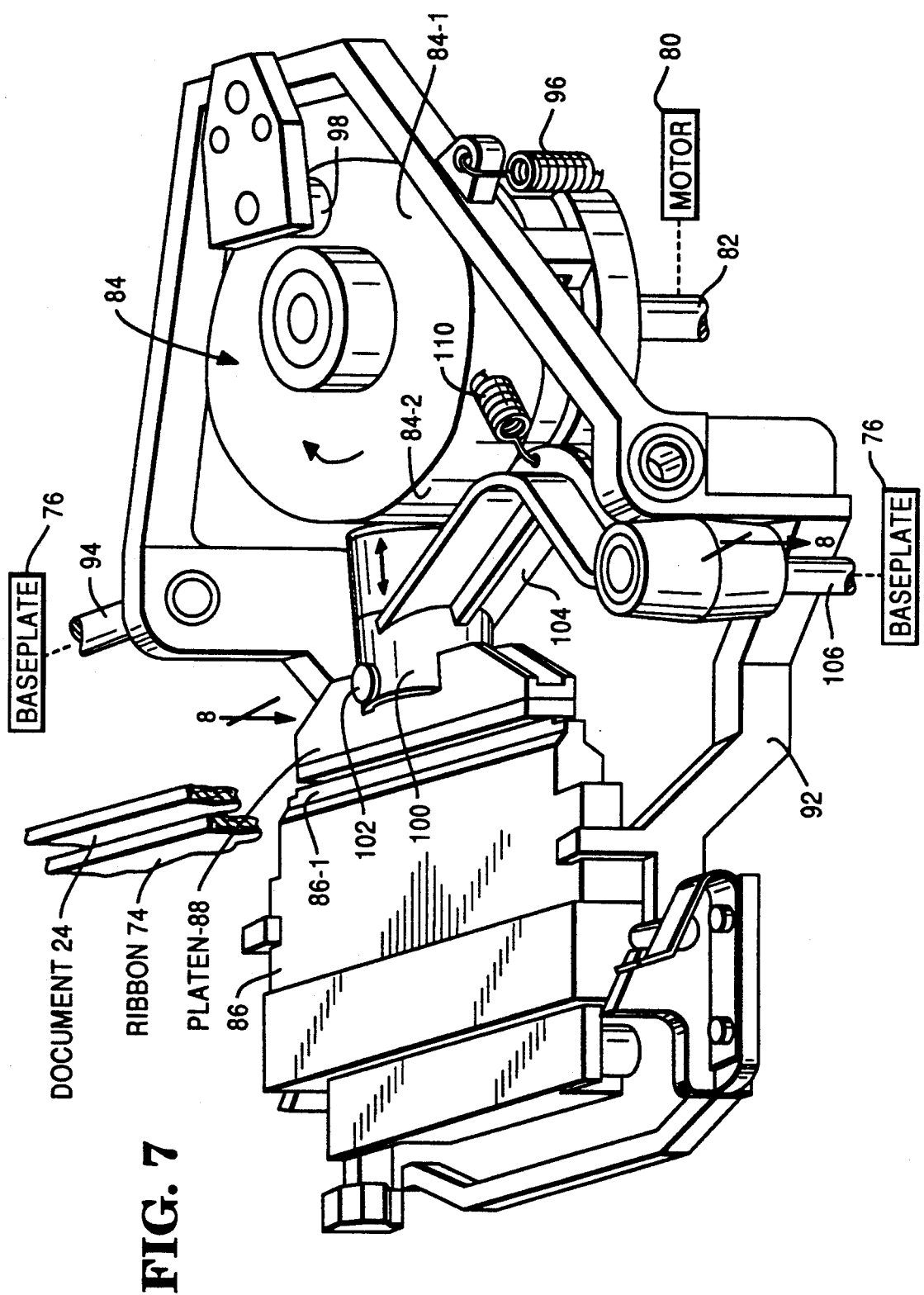
FIG. 7 is an isometric view of a portion of a MICR encoder shown best in FIG. 3.

The printer 70 includes a thermal print head 86 and a platen 88 as shown in FIG. 7, with the document 24 and the thermally active ribbon 74 positioned therebetween; however, the ribbon 74 and the document 24 are displaced to one side as shown to simplify the drawing. The print head 86 prints one horizontal dot row 86-1 at a time as it sweeps down the face of the platen 88. The print head 86 is wide enough to print up to 15 MICR characters simultaneously as the print head 86 moves along a radius which corresponds to the radius of curvature of the face of the platen 88. The print head 86 moves along the radius mentioned due to being mounted on a frame 92 which is pivotally mounted near its center on support shafts, like 94. One end of the frame 92 is biased downwardly, as viewed in FIG. 7, due to the bias of tension spring 96; this biasing keeps a cam follower 98 on the frame in contact with the face portion 84-1 of the cam 84. The face of the cam 84-1 is contoured to move the dot row 86-1 of the print head 86 to effect the printing of a line of MICR characters and to return the print head 86 to a home position for the start of the next printing cycle.

Figure 8:
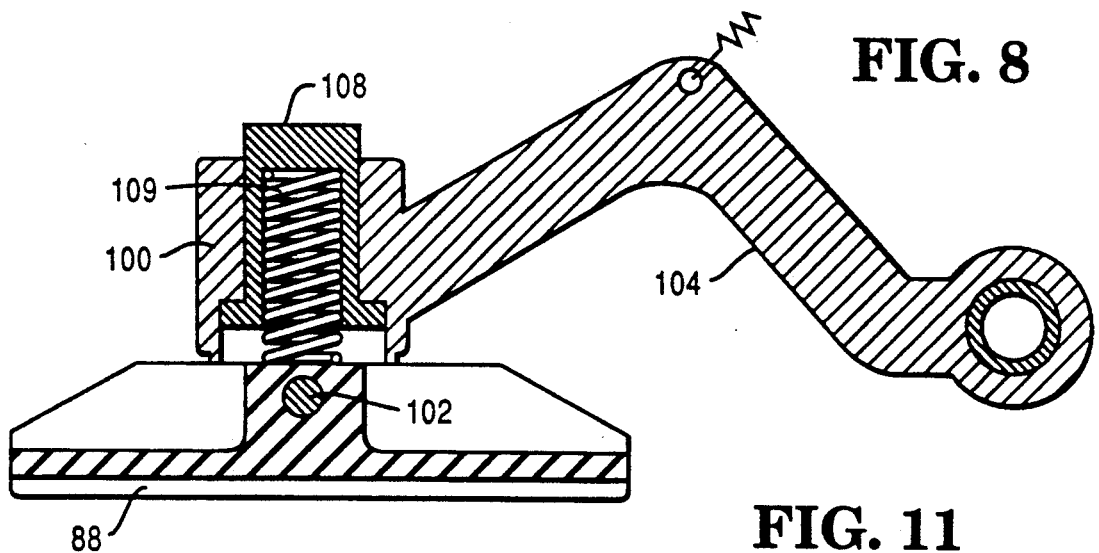
FIG. 8 (shown on the sheet with FIG. 5) is a plan view, partly in cross section, taken along the general line of 8—8 of FIG. 7.

The platen 88 is moved into and out of position to effect printing in conjunction with the print head 86 in the following manner. The platen 88 is pivotally joined to a tubular cylindrical member 100 by a pin 102, with the tubular cylindrical member 100 having an arm 104 extending therefrom. The remaining end of the arm 104 is pivotally mounted on a pin 106 (FIG. 7) upstanding from the baseplate 76. A flanged tubular member 108 is slidably mounted in the tubular cylindrical member 100 (FIG. 8), with a compression spring 109 being mounted in the flanged tubular member 108 to bias the platen 88 towards the print head 86. The flanged tubular member 108 is biased into engagement with a side portion 84-2 (FIG. 7) of the cam 84 by a tension spring 110 secured to the arm 104 and the baseplate 76. The side portion 84-2 of the cam 84 has the appropriate contour to enable the platen 88 to be moved out of the document track 18 as a document 24 approaches the printer 70, and to move the platen 88 towards the print head 86 in operative printing relationship therewith. The printer 70 is controlled by the control means 11 alluded to earlier herein.

After a line of characters has been printed, continued rotation of the cam 84 releases pressure on the tubular member 108, permitting the platen 88 to be moved away from the print head 86. A stepper motor 112, which is part of the ribbon supply means 72, is energized by the control means 11 to provide a fresh supply of ribbon 74 to the printer 70. In doing this, the ribbon 74 is peeled from the bottom of the line of characters which was printed while the cam 84 is rotated to pivot the print head 86 towards the high or home position in the embodiment described.

The printer 70 and the ribbon supply means 72 are mounted on the base plate 76 to enable printer 70 to be installed as a unit on the chassis 14 of the machine 10. The entire construction of the machine 10 is designed so that most all the elements included in the machine 10 can be mounted on the chassis from above or from the "Z" axis as it is referred to. The machine 10 also includes a fan 114 to provide forced circulation of air through the machine. Additional details as to how a printer of the type disclosed herein operates may be obtained from U.S. Pat. No. 4,712,113, for example.

Figure 5:
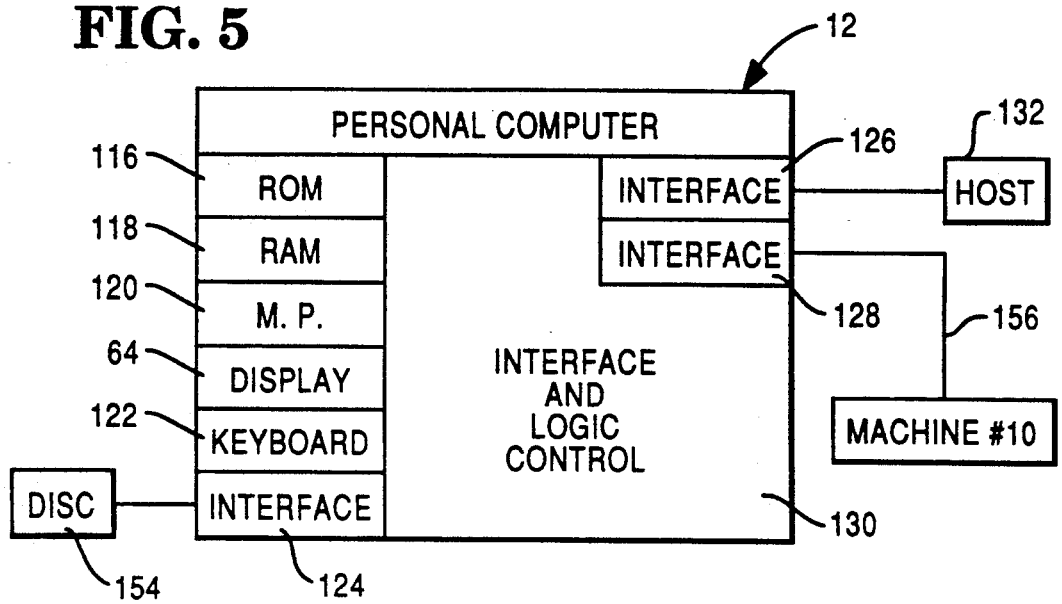
FIG. 5 is a schematic diagram showing various components included in the personal computer shown in FIG. 1.
Figure 6:
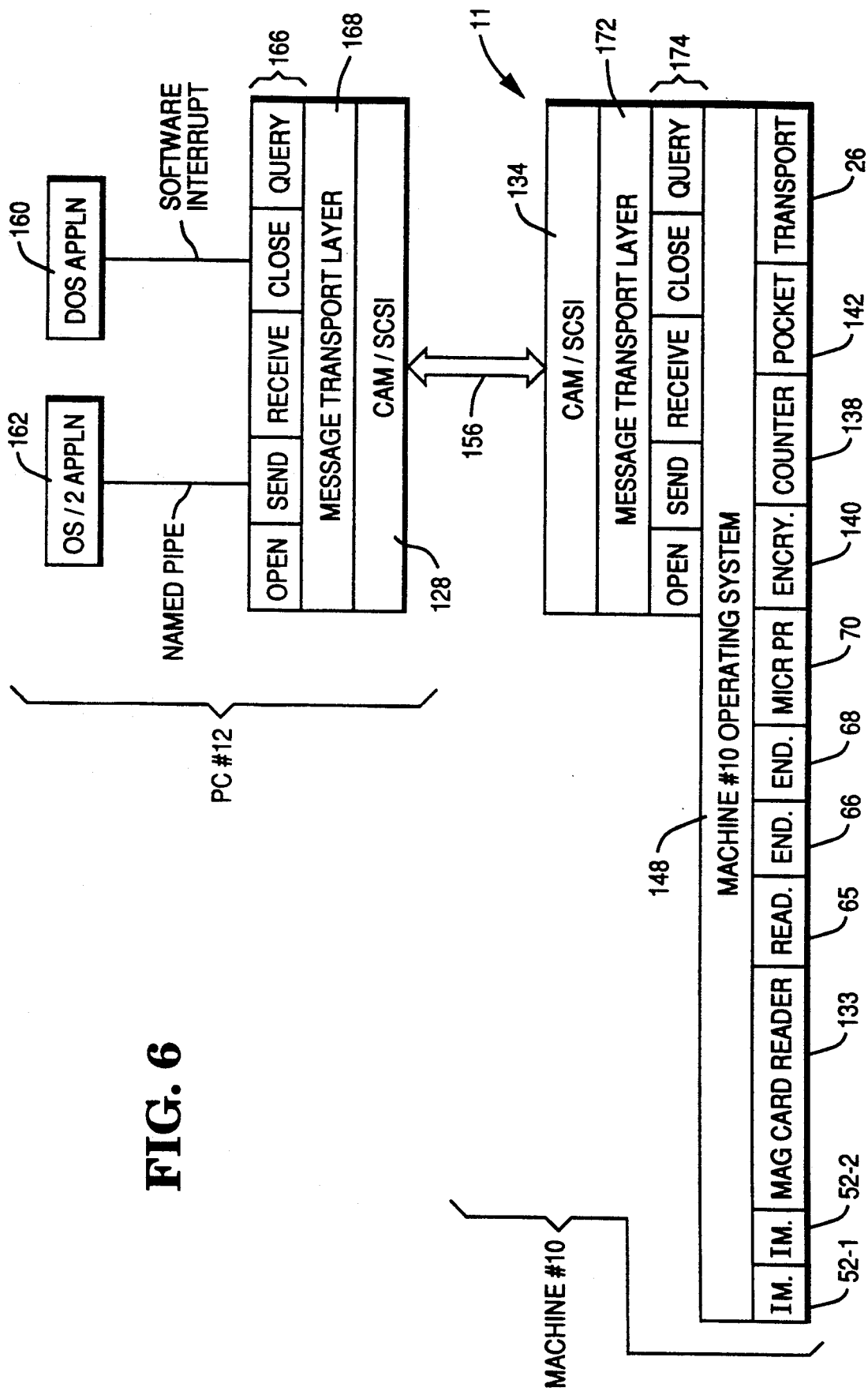
FIG. 6 is a schematic diagram showing various layers of software included in the personal computer shown in FIG. 5 and the machine shown in FIGS. 1-4.

The control means 11 alluded to earlier herein is shown in FIGS. 5 and 6. The control means 11 includes that shown in FIG. 6 which includes elements within the PC 12 and the machine 10 itself. The PC is a standard PC which has a ROM 116, RAM 118, microprocessor (MP) 120, keyboard 122, interfaces 124, 126, and 128 which are all coupled to the MP 120 via interface and control logic 130. The interface 128 may be a Small Computer Systems Interface (SCSI) chip, for example. The form of the PC 12 shown in FIG. 5 is different from the form of an actual PC; however, this form is shown to present the various functional relationships associated with a PC and to simplify FIG. 5. The PC 12 itself may be coupled to a host 132 for reasons not important to an understanding of this invention.

The control means 11 shown in FIG. 6 is also displayed in FIG. 9 to show it as hardware and to show how the hardware is coupled to the PC 12. Some of the various pieces of hardware included in the machine 10, like the MICR printer 70 and the imagers 52-1 and 52-2, which are shown in FIG. 6 are also shown in FIG. 9.

The machine 10 may also include a magnetic card reader (M.C.R.) 133 (FIGS. 1 and 6) which may be used for entering a customer's account number, library card number, or security access code just to name a few of the functions to which the reader 133 may be put. The reader 133 could also be used to read a "Smart" card. A Smart card is generally one which has non-volatile memory thereon and may include a processor thereon.

The machine 10 also includes a Small Computer System Interface (SCSI) connector 134 (FIG. 2) for coupling the machine 10 to the PC 12. The machine 10 also includes a counter 138 (FIG. 6) which may be used to count the number of documents 24 which the machine has processed. As an optional feature, an encryption system or module 140, also shown in FIG. 6, may be used encrypt data as will be described hereinafter. A pocket or a power pocket 142, not important to an understanding of this invention, may also be included with the machine 10.

The control means 11 for the machine 10 has two types of software which operate or run the machine 10. The first of these is embedded in a Boot ROM 144 (FIG. 9) and the second is Download Software. The Boot ROM 144 software is executed when the machine is first powered "on". The Boot ROM 144 is resident in the machine 10, and it may be located on a main circuit board 146 shown best in FIG. 4. A feature of this invention is that circuit board 146 is located in the bottom of the machine 10, and that most of the components like the imagers 52-1 and 52-1, and the front and rear endorsers 66 and 68 are simply "plugged" into the circuit board 146 to effect the "Z" type mounting for these components as discussed earlier herein and to eliminate intermediate harnessing.

Returning to the Boot ROM 144, this ROM contains the following logic:

1. It contains a Self Diagnostic Code which is used to test the integrity of the chip set 148-1 and the RAM 148-2.

2. It contains code to download the Operating System Software 148.

3. It contains the SCSI 134 (interface) to allow for communications with the PC 12.

4. It contains code to handle the logic for accepting commands from the PC 12 and acting on them.

After the Boot ROM 144 has set up the Operating System Software 148, it waits for a message from the PC 12. The Operating System Software 148 is executed by hardware which includes a PC chip set or PC 148-1. PC 148-1 is essentially a personal computer without mass storage discs, a keyboard, and display, for example, and it includes the RAM 148-2 alluded to above.

The control means 11 (FIG. 9) includes an image processing system 150, a track encoder system 152, and a magnetic card reader system 153. These systems 150, 152 and 153, for example, contain their own Boot ROMs (not shown) to boot up these systems to accept downloaded data. Once the downloaded data is received in the systems 150, 152, and 153 from the PC 12 via the interface 156 and the PC chip set 148-1, control is given to Operating System Software 148 which can handle the functions and coordinate the activities as required for the machine 10.

Once the Operating System Software 148 has been downloaded to the machine 10, control is passed from the Boot ROM 144 to the Operating System Software 148. Once the Operating System Software 148 has control, it then starts to handle all the messages received over the communication link 156 between the PC 12 and the machine 10.

The Download Software includes the Operating System Software 148 and its related software which enables it to communicate with the outside world and to perform functions when asked of it. The Download Software is usually stored on a disc 154 and is accessed through a disc operating system 154-1 coupled to the PC via the interface 124. This is one of the features of this invention in that the control of the machine 10 can be changed by changing the Software on the disc 154. When new control is to be initiated for the machine 10, the new Software may be stored on a new disc 154 and sent to a machine 10 used by a customer. The Download Software also includes codes needed to enable the elements like systems 150, 152, and 153 to perform their functions.

Figure 4:
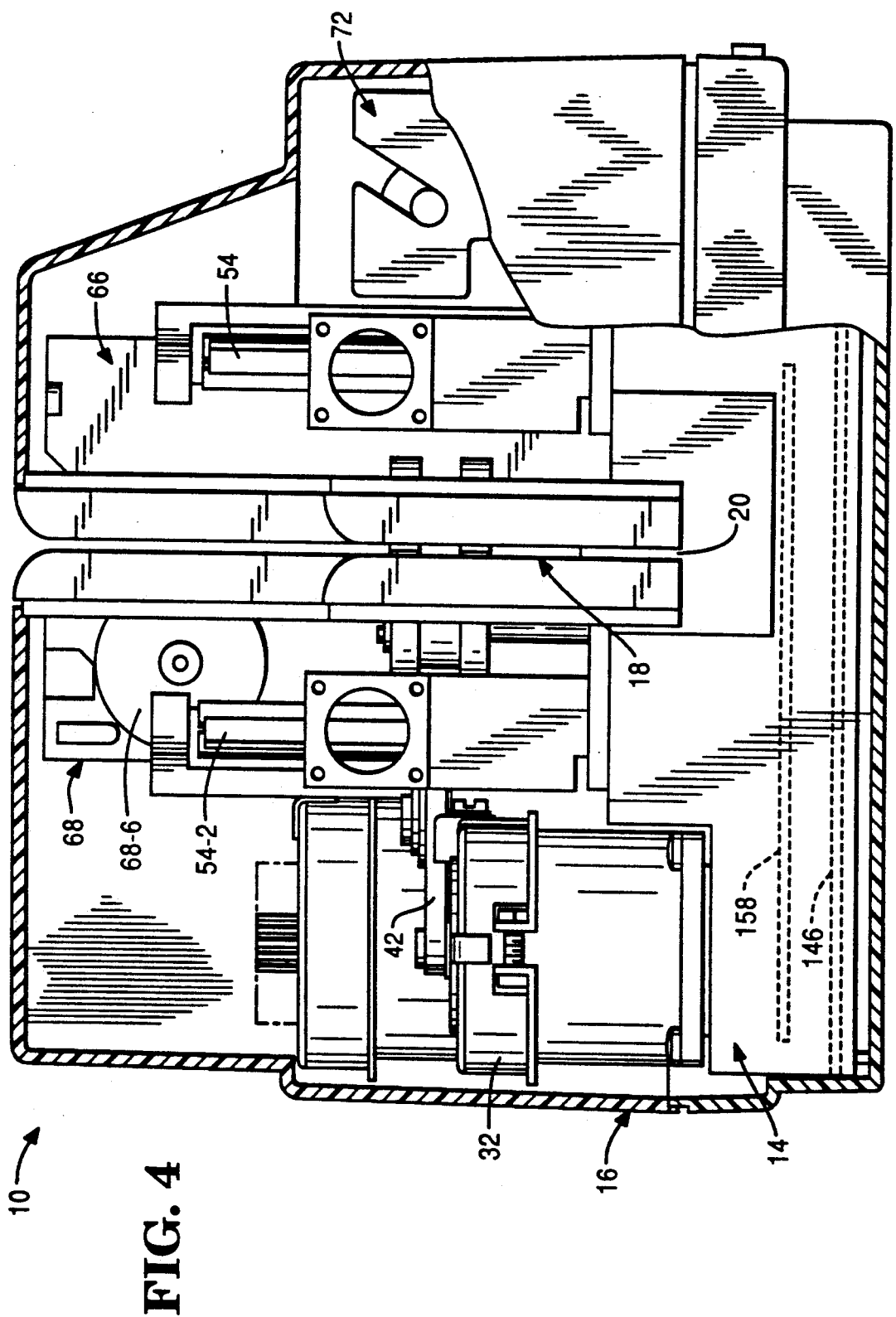
FIG. 4 is an end view in elevation of the machine shown in FIG. 2 when looking from the direction of arrow B in FIG. 2.

Another feature of the machine 10 is that it is modular in design, and it can easily be adapted to fit customers' requirements. For example, the main circuit board 146 (FIG. 4) alluded to is positioned at the bottom of the machine 10 and is used to handle most all of the functions of the machine. If, however, a customer requires the use of a magnetic card reader 133 shown in FIG. 1 and an encrypter 140, the hardware associated with these modules may be placed on a piggy back board 158 (FIG. 4). The piggy back board 158 is positioned above the main circuit board 146 so as to not interfere with the capability of the other modules, like the imagers 52-1 and 52-2, for example, to be plugged into the main circuit board 146 to effect the "Z" type mounting discussed earlier herein.

Once the Operating System Software 148 has control, it handles all the messages received from the PC 12 over the communication link 156. The handling of messages in the PC 12 can be described in relation to FIG. 6.

The PC 12 (FIG. 6) may be a single-tasking PC which utilizes a DOS application 160, for example, with a software interrupt, or it may be a multi-tasking PC which utilizes an OS/2 application 162 with a named pipe or device driver interface. The PC 12 provides a variety of services which are, Open, Send, Receive, Close, and Query as shown on line 166 of FIG. 6. The various services mentioned are handled through a Message Transport Layer (MTL) 168 (to be discussed later herein) and a communication chip like SCSI 170. The "CAM" associated with the SCSI 170 is conventional and stands for Common Access Method.

A service from the PC 12 (FIG. 6) is received at the machine 10 via the SCSI 134 and the MTL 172 which corresponds to MTL 168 for the different services shown on line 174; these services correspond to the services shown on line 166 associated with the PC 12. The Operating System Software 148 provides the interface to the various elements shown on the bottom of FIG. 6. When processing a document 24, the Operating System Software 148 coordinates the running of the various devices required to process the document.

As an example, assume that an operator or teller wanted to encode or print the monetary value of a check or document on the document 24 itself. In this situation, the teller enters the monetary amount of the document on the keyboard 122 of the PC 12 and actuates an enter key thereon to encode the data. The teller then positions the document 24 at the entrance area 20 so that it is properly positioned in the document track 18 as indicated by the first and second sensors 28 and 30. When so positioned, the PC 12 sends two messages, like Write and Move, to the Operating System Software 148 of the machine 10 to begin the processing. The Move operation is used to initiate requests that are document related. The Operating System Software 148 then picks up these commands and translates them into the appropriate signals to move the document 24 and to energize the MICR printer 70. In this regard, the stepper motor 32 is energized in the appropriate direction by the track encoder system 152 to move the document 24 towards the printer 70. The track encoder system 152 includes a processor 152-1 for handling the various activities associated with moving documents within the machine 10. When the document 24 approaches the document registration sensor 78 (FIG. 3), the stepper motor 32 positions the document 24 at the printer 70 in printing relationship therewith.

As far as the magnetic card reader 133 (FIG. 9) is concerned, it is designed so that it reads the data from a card whenever a card is inserted therein or removed therefrom. The data which is read from the card is stored within a buffer within the magnetic card reader system 153, and it sends a notice to the Operating System Software 148 that a card has been read and that the data read is stored in the buffer. The Operating System Software 148 then notifies the Host Application that data which was read is stored in the buffer. Generally, the Host Application issues a Read Operation, and the Operating System Software 148 passes the request to the magnetic card reader system 153 which formats the data to be sent and sends it to the Operating System Software 148 which then forwards the message to the Host Application. This is how most messages are handled by the control means 11.

With regard to FIG. 9, the MICR printer 70 is coupled to the Track Encoder System 152 via a bus 71. The encrypter 140, a controlled modular Pocket 140, and the Magnetic Card Reader System 153 are coupled to the Operating System Software 148 via a bus 136. The interface 134 couples the bus 136 to the bus 156 leading to the PC 12. The imagers 52-1 and 52-1 are coupled to the Image Processing System 150 via a bus 139.

The monetary amount to be printed on the document 24 in the example described in the previous paragraph is forwarded from the PC 12 to the Operating System Software 148 (FIG. 9) which feeds the data to the MICR printer 70 to print the data on the document 24 in a routine manner. After the data is printed, the print head 86 is moved to its home position, as previously described, and the stepper motor 112 (FIG. 3) is energized to provide a fresh supply of ribbon 74 to ready the printer 70 for the next printing operation. After printing, the document 24 can be ejected from either end of the document track 18 depending upon the particular application.

Figure 10:
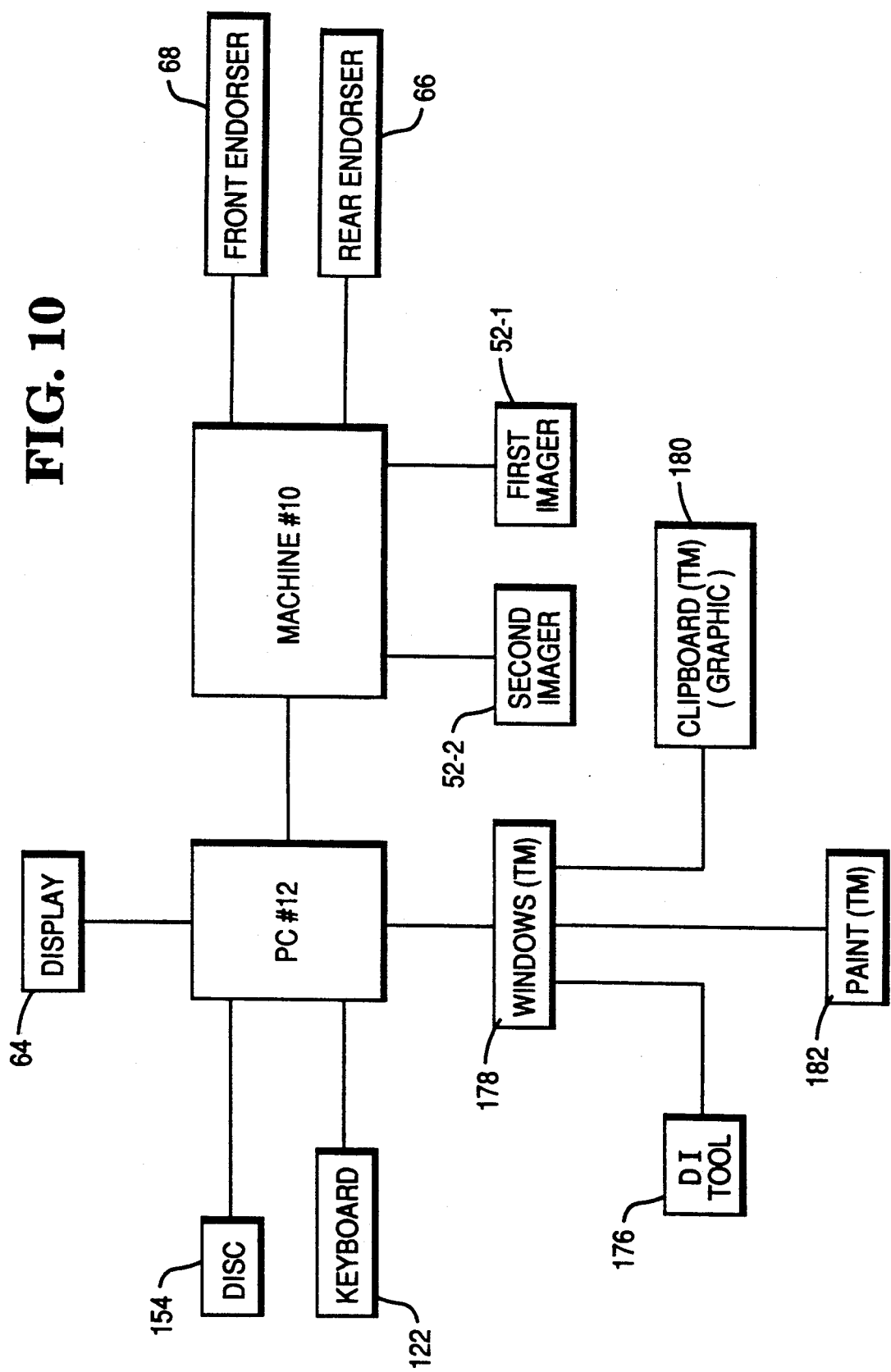
FIG. 10 is a schematic diagram showing how certain software associated with the PC and the machine shown in FIG. 1 are associated.

One of the features of the machine 10 is that it is very versatile in what it can do. In order to provide some of this flexibility, a Document Information Tool (DI Tool) 176 is used. The DI Tool 176 (FIG. 10) is a Windows(TM) based application; this application is owned by Microsoft. In other words, the DI Tool 176 runs only in a Windows(TM) environment on a PC. FIG. 10 shows schematically that the DI Tool 176 runs in a Windows(TM) 178 environment, with the Windows(TM) 178 being run on the PC 12. The Windows(TM) 178 software has a Clipboard(TM) 180 associated with it for storing data to be worked on or "edited", for example. From the Clipboard(TM) 180, data may be transferred to a Paint(TM) program 182 for editing functions like enhancing images, for example. Windows 178(TM) and Paint(TM) program 182 are software programs available from Microsoft Corporation. Other programs like Paint(TM) in addition to the one identified may be used.

The DI Tool 176 is a Windows(TM) based application which enables one to designate areas on the document 24 for reading or printing functions.

The DI Tool 176 performs three major functions with regard to the machine 10. These functions are:

1. Logo Generation: This function creates files which contain graphic information for "Logos" which may be printed either on the front or back of the document 24 by the front and rear endorsers 66 and 68, respectively. With some banks, a graphic may be part of the endorsement or Logo which a bank normally stamps on a check when the check is accepted by the bank.

2. Zone Specifications: This function enables the specifying of zones on the document 24 where data can be printed by the front and rear endorsers 66 and 68, respectively. Zones can also be specified to indicate where recognition is to be performed by the document reader 65 (FIG. 6).

3. Forms Printing Mode: This function enables the defining of positions on the document 24 where printing is to be effected for forms printing.

With regard to Logo Generation, there are two general ways to generate a Logo or graphic. A first way is to read an image from the disc 154 or to lift the image from either the first or second imager 52-1 or 52-2 and transfer that image to the display 64 of the PC 12. Once the image is on the display of the PC 12, that portion of the image which contains the Logo desired can be selected. After selection, the portion selected is copied to the Clipboard(TM) 180. From the Clipboard(TM) 180, the portion of the image is "pasted" to the Paint(TM) program 182 which can be used to enhance the image to make it clearer for printing, for example. When the enhanced image is complete, it is copied to the Clipboard(TM) 180. The DI Tool 176 is then used to "paste" the enhanced image from the Clipboard(TM) 180 to the DI Tool 176, and from here, the enhanced image or Logo is transferred to a Logo File on the disk 154. From the disk 154, the Logo may be transferred by an application and forwarded to the Operating System Software 148 for use in printing on the front or rear of a document 24 by the front and rear endorsers 66 and 68. This is a feature of this invention in that it eliminates hand stamps, and it also provides a great deal of flexibility for printing different Logos on different documents compared to printing a Logo on a document by a fixed Logo on an endorser positioned along the document track 18.

Another way of creating a Logo for use with the machine 10, is to generate a Logo from scratch. In this regard, the Logo may generated by using the Windows(TM) and Paint(TM) programs 178 and 182. The Logo is selected and copied to the Clipboard(TM) 180. From the Clipboard(TM) 18 the Logo image is pasted to the DI Tool 176, and from here, the Logo is transferred to the Logo file on the disc 154. From the disc 154, the Logo may then be used according to a particular application as described.

In summary, the Logo generation replaces the need to have a number of hand stamps which need to be used by banks. Instead, the Logos can created, saved on the disc 154, and printed at any time according to a particular application. Logos can be created or updated as the need arises. For those applications which need a large amount of Logos in which specific Logos must be placed on specific documents 24, a teller need not fumble with a number of hand stamps, for example. The teller just needs to press an appropriate key, for example, on the keyboard 122 in order to have the correct Logo printed at the desired location either on the front or rear of the document 24 by the front and rear endorser 66 and 68, respectively. The correct Logo could also be selected by a particular application, or a code therefor could be selected from data read by the magnetic card reader 133, for example. As an aside, the DI Tool 176, the Clipboard(TM) 180, or the Paint(TM) program 182 shown in FIG. 10 can individually access the disc 154 to get information needed, or they can be used to transfer information to the disc 154.

Figure 11:
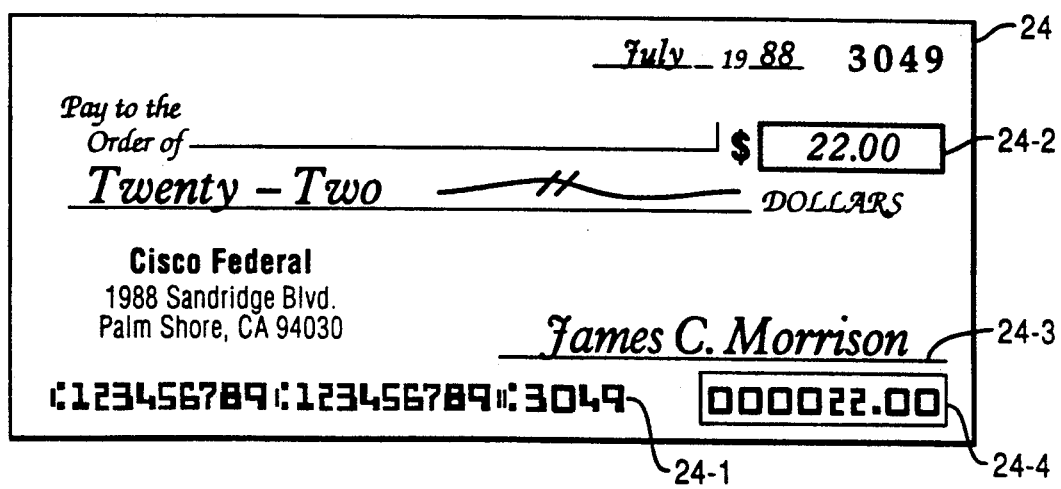
FIG. 11 (shown on the sheet with FIG. 5) is a schematic diagram showing zones associated with a document to be processed by the machine shown in FIG.

A second feature of the DI Tool 176 is that it enables a user to specify zones on a document 24 for either recognition or printing anywhere on the document 24. For example, FIG. 11 shows certain zones on a document 24, with zone 24-1 being the bank #, customer account #, check or document type #, etc., with zone 24-2 being the monetary amount of the check as written in by the customer, with zone 24-3 being the customer's signature, and with zone 24-4 being the monetary amount of the check after it has been encoded thereon. The monetary amount in zone 24-4 is generally encoded in MICR ink, with a CMC7 font and optical fonts being used in European countries and with an E13B font being used in the U.S. The document type # may be used to provide a key as to where all of the above named information is to be found for recognition or where certain information or data is to be printed on the document 24. The zone information for reading or printing is saved in a Document Information File on the disc 154. The Logo along with information to be printed is saved on the disc 154 (in an ASCII format) along with the associated document type #.

When recognition is to be performed on a document 24, the imagers 52-1 and 52-2 are used to image the front and rear of the document 24, respectively. The image processing system 150 (FIG. 9) has a processor 150-1 running software, and a RAM 150-3 for performing the image processing. The first imager 52-1 may be used to image the front of the document 24 as the document is moved from the left to the right as viewed in FIG. 2. The imaging is effected by generating successive scan lines of pixel data as the document is moved past the imager 52-1 by the document transport means 152. The pixel data may be processed, conventionally, by the image processing system 150, and thereafter, the processed data is forwarded to the document reader 65 (FIG. 6) for character recognition. In the embodiment described, the character recognition is performed optically. Conventional reading algorithms may be used. Naturally, the reader 65 corresponds to the type of data to be read; for example, if the data to be read is printed in a CMC7 font, the reader 65 has the capability to read the CMC7 characters optically in the example described.

As stated previously, the track encoder 152 enables the document 24 to be moved bi-directionally within the document track 18. This means that the rear of the document 24 may be read from right to left also if the document is moved to the left as viewed in FIG. 2; this would enable the same processing algorithms to be used in the image processing system 150. Both the front and rear of the document 24 could be read at the same time; however, the memory requirements for storing the data would be greater than that normally contemplated for the machine 10. The image processor 150-1 can "flip" the images resulting from different scanning directions, so the imaging direction is not a critical issue. This is true for both the first imager 52-1 and the second imager 52-2. The track encoder 152 also functions as a staging area (to position and hold a document 24 at a particular location within the document track 18) to provide a great deal of flexibility to the machine 10 with regard to moving the document 24 within the document track 18; this is a function of software control within the PC 12. In the embodiment described, recognition is performed only on one specified zone like zone 24-2 at a time. If more than one zone is to be subjected to character recognition, the second zone must be specified after the first zone is processed. Information for a subsequent zone to be read can be retrieved by the Operating System Software 148 from the image processing system 150 where image data for one document 24 is stored in the RAM 150-3.

In the embodiment described, the image data from the imagers 52-1 and 52-2 has a resolution of 200 pixels per inch, and the image data or pixels are stored in the RAM 150-3 (FIG. 9) as gray levels and bi-levels after processing by the image processing system 150. The Host Application from the PC 12 designates a zone of the image data to be subjected to optical character recognition. The image processing system 150 has software for performing optical character recognition on the designated zone. The results of the recognition process are then sent to the Host Application. If the Host Application decided that an additional read were necessary, it would issue another read operation for a new zone to be subjected to character recognition on the image data stored in the RAM 150-3.

The Forms Printing Mode which is also a function performed by the DI Tool 176 is similar to specifying zones, as just described; however, instead of specifying an entire zone, the location where the printing is to start is specified. A form to be printed may be considered as another document type, with a number of positions defined as to where the printing is to be done, with this information being saved in a document information file on the disc 154. The application within the PC 12 then reads the information for the form specified to get the starting positions for the form. The application also prompts the user (via the display 64) to obtain the data to be applied to the form to be printed. After all the information is entered, the application in the PC 12 formats the appropriate messages and sends them to the machine 10 for handling. The user then inserts the appropriate form or document to be printed upon in the document track 18, and the information to be printed is then printed in the designated areas on the form or document 24. The actual form itself could also be printed by inserting a blank form in the machine 10.

From what has been just described, it is apparent that the machine 10 allows a customer to replace a conventional forms printer with the machine 10. This is a feature of the present invention in that it can print data in whatever format is specified so as to produce a variety of printed forms. With the machine 10, one is able to print deposit slips, for example. The particular method for generating a deposit slip along with the technique for entering the checks making up a deposit slip is dependent upon particular software associated with the PC 12. For example, a teller may enter a customer's magnetic identification card in the magnetic card reader 133 so as to identify the particular account to which the check deposits are to be credited. Thereafter, the teller places a check to be deposited into the document track 18 and enters the monetary amount of the check on the keyboard 122. When an enter key is actuated, the check or document 24 is moved to the printer 70 in preparation for having the monetary amount of the check printed thereon. After printing the monetary amount, the transport means 26 is actuated to move the document 24 back towards the rear endorser 68, for example, to have the bank endorsement printed on the back of the document. In some situations, there may be printing effected on the front of the document 24. In some European banks, the particular Logo associated with the endorsement may be dependent upon a particular branch within a banking system, for example. In this situation, the teller may insert a "type" document on the keyboard 122 to have the appropriate Logo selected, or, for example, the type document may be obtained from reading zone 24-1 (FIG. 11) as the document 24 is moved past the imager 52-1 on its way to the printer 70. Again, this type of activity is controlled by the software associated with the PC 12. As stated, this is one of the features of the machine 10.

Continuing with the example of generating a deposit slip, the teller then repeats the process described in the previous paragraph for the remaining checks making up the complete deposit. After the last check is entered, the teller then actuates a key like Total on the keyboard 122 to complete the transaction. The display 64 would then provide a lead through instruction requesting that the teller insert a deposit slip form in the document track 18, and after the form is properly aligned within the document track 18, a print key, for example, on the keyboard 122 is then used to position the form in printing relationship with the front and rear endorsers 66 and 68. Naturally, the initiation technique is dependent upon the particular application used. The transport means 26 in cooperation with the front and rear endorsers 66 and 68 will print along horizontal and vertical directions to effect the desired printing. Some of the forms may be of the loose leaf variety which enable a user to insert the deposit slip in a loose leaf binder. This same technique may be used for pass book printing so as to eliminate the need for a separate pass book printer. Again, this is one of the features of the present machine 10.

One of the requirements of an item processing machine when it is used in an on-line branch item processing system relates to the communications with the host or PC 12. As stated earlier herein, the various services offered by the PC 12 are shown on line 166 of FIG. 6. The formats for these services shown in FIGS. 12-16, with Open shown in FIG. 12, and with Send, Receive, Close, and Query being shown in FIGS. 13, 14, 15, and 16, respectively.

A Host Application residing on the disc 154 of the PC 12 and the Operating System Software 148 (FIG. 6) interact through the Message Transport Layers (MTL) 168 and 172, with these two named programs communicating by passing messages to each other. As used herein, a message is defined as a structured set of fields containing values representing information and commands. The Host Application always sets itself up to send or receive these messages, even though the messages are controlled by the MTLs 168 and 172.

Before program interaction can begin, the Host Application must first download the Operating System Software 148 to the machine 10, together with any other software or programs such as character recognition software associated with the reader 65 shown in FIG. 6. Once the software is downloaded and initialized, the Host Application can start program interaction by issuing an MS-DOS ™ software interrupt only when operating in a DOS environment The Host Application then communicates with the MTL 168 by issuing a "service" request. Services are provided by the MTL 168.

The services mentioned are Open, Send, Receive, Close, and Query as shown in lines 166 and 174 in FIG. 6. Services are command/response structures that the Host Application uses to communicate with the MTL 168; these structures are used to simplify the interaction between the Host Application and the Operating System Software 148. When the Host Application specifies a service structure, the MTL 168 assembles the necessary information and commands to perform the function. For example, if the Host Application wants to encode data on a document 24, the following services would be performed:

1. The Host Application first opens the communications driver (SCSI 128) by using an Open service; this should be done only if the communications driver is closed.
2. The Host Application then performs a Query service. The Query service allows the Host Application to determine the destination ID of the machine 10. This is done only if the Host Application does not already know the destination of the machine 10.
3. If the machine 10 has just been powered up, the Host Application would then download all required software to the machine 10. The destination ID from the Query service would be used to insure that the download goes to the machine 10. The Send service is used to send the download information. Usually steps 1, 2, and 3 are performed only once when the Host Application is started.
4. If the machine 10 is ready to run documents therein, the Host Application would then send the encode data (in the example being described) via a Write command using Send Service to the MICR printer 70 to encode the document 24. The destination ID is again used in this service to insure that the information is sent to the machine 10.
5. The Host Application waits for a document 24 to arrive; this is received through a Receive Service. Once a document 24 is present and properly aligned within the document track 18 as indicated by the sensors 28 and 30, the Send Service is used to send a Move command to the machine 10 to encode the document 24. The destination ID is again used for sending to the appropriate unit.

The Send service requests tell the MTL 168 about messages it must assemble and send to the Operating System Software 148 in the machine 10 so that the encoding can occur in the example being described.

If the Host Application wants to receive information from the machine 10, it follows the same principles described, using the appropriate service structures. An important consideration here is that the Host Application should be set up to receive messages at regular intervals. When the Host Application is set up in this manner, it can handle the messages from the machine 10 quickly and efficiently.

In summary, the MTL 168 associated with the PC 12 and the MTL 172 associated with the machine 10 handle the basic services shown in FIG. 6. When a service has been handled, the MTL 168 or 172 returns a status code. The status code indicates the result of servicing the request. The status codes can be changed to meet changing situations; however, the following codes are used. The following status codes (hex) can be returned from a service request:

```
0000 = MTL handled successfully.
0001 = Message not available from the MTL.
FFFF = Invalid service request to the MTL.
FFFE = MTL already open (Open Service).
FFFD = Invalid path number specified.
FFFC = Invalid buffer length specified.
FFFB = MTL not open. Send, Receive, or Query Service.
FFFA = Send service message buffer not specified.
FFF9 = Invalid destination ID.
FFF8 = Invalid data length on a Send service.
FFF7 = MTL service request failed.
FFF6 = The receiving MTL is busy.
FFF5 = The MTL is presently receiving.
FFF4 = While receiving, the MTL detected an error.
FFF3 = There is no other MTL to talk to.
FFF2 = On an Open service, no CAM layer was found.
FFF1 = The SCSI bus has been reset. Perform a restart.
FFF0 = A timeout has occurred on a Send service.
```

To send a service to the MTL 168, the Host Application fills in the appropriate fields in the Service structure. The various fields will be discussed later herein. The Host Application then passes the Service Identification number and the address of the Service structure to the MTL 168 via a software interrupt when working with a DOS application 160, for example. Software interrupts 60H and 66H can be used. The Software interrupt to use can be set when the communications driver is first loaded into memory. Setting the Software interrupt is done through the CONFIG.SYS file associated with DOS.

To transmit a message, the DOS application, the Operating System Software 148, or the OS/2 Application 162 must prime the Send service structure with message details and data and then request the MTL to "send" the message. The result of performing the "Send" service is communicated to the MTL application through a Send service return code.

To consume a message from the MTL, the application fills the Receive service structure with the appropriate information and then requests the MTL to "receive" a message. The MTL transfers the message from its communication path buffer into an application's receive buffer. Message transfer halts when one of the following conditions occurs:

1. The message is transferred in its entirety.
2. The application's receive buffer is filled before the current message is transferred in its entirety.

The application must issue further "receives" until the entire message is consumed. The result of performing a Receive service is communicated to the MTL application through the Receive service return code.

The Query service is used by the Host application to determine the destination ID of the machine 10. This destination ID is used with the Send service to insure that the message is sent to the intended device. The Receive service reports the source ID of a message received from a device; this could also be used as the destination ID for the Send service. The following chart shows the services and the Identification value associated with the service.

| SERVICE | SERVICE ID (Hex) |
| --- | --- |
| Open = | 1 |
| Send = | 2 |
| Receive = | 3 |

-continued

| SERVICE | SERVICE ID (Hex) |
|---|---|
| Close = | 4 |
| Query = | 5 |

The Query service 5, for example, can grow to meet additional requirements of the machine 10.

The following are some additional points associated with the functioning of the MTLs 168 and 172 shown in FIG. 6:

1. The MTL suspends its resident application until the requested service completes. The MTL does not suspend its resident application to wait for a response to commands sent.

2. The MTL performs minimal service and message validation. Complete validation is performed at the lowest level of software that utilizes the data.

3. In the event of both MTLs 168 and 172 attempting to transmit a message at the same time, the MTL 172 at the machine 10 accepts the message from the PC 12 and retries its message transmission at a later time.

4. Each of the MTLs retries a failed message transmission a limited number of times before reporting a transmit failure to the associated application.

5. Each of the MTLs denies message reception until the associated message path receive buffer is empty. Each MTL denies its application new message reception until the message currently in the associated message path receive buffer is completely consumed by its application.

6. Each MTL shuts down the PC 12 to machine 10 communications link 156 when its application issues a Close. The result of performing a Close service is communicated to the associated MTL's application through the Close service return code.

After discussing the various services used, it seems appropriate to discuss the command/response structures for these services.

Figure 12:
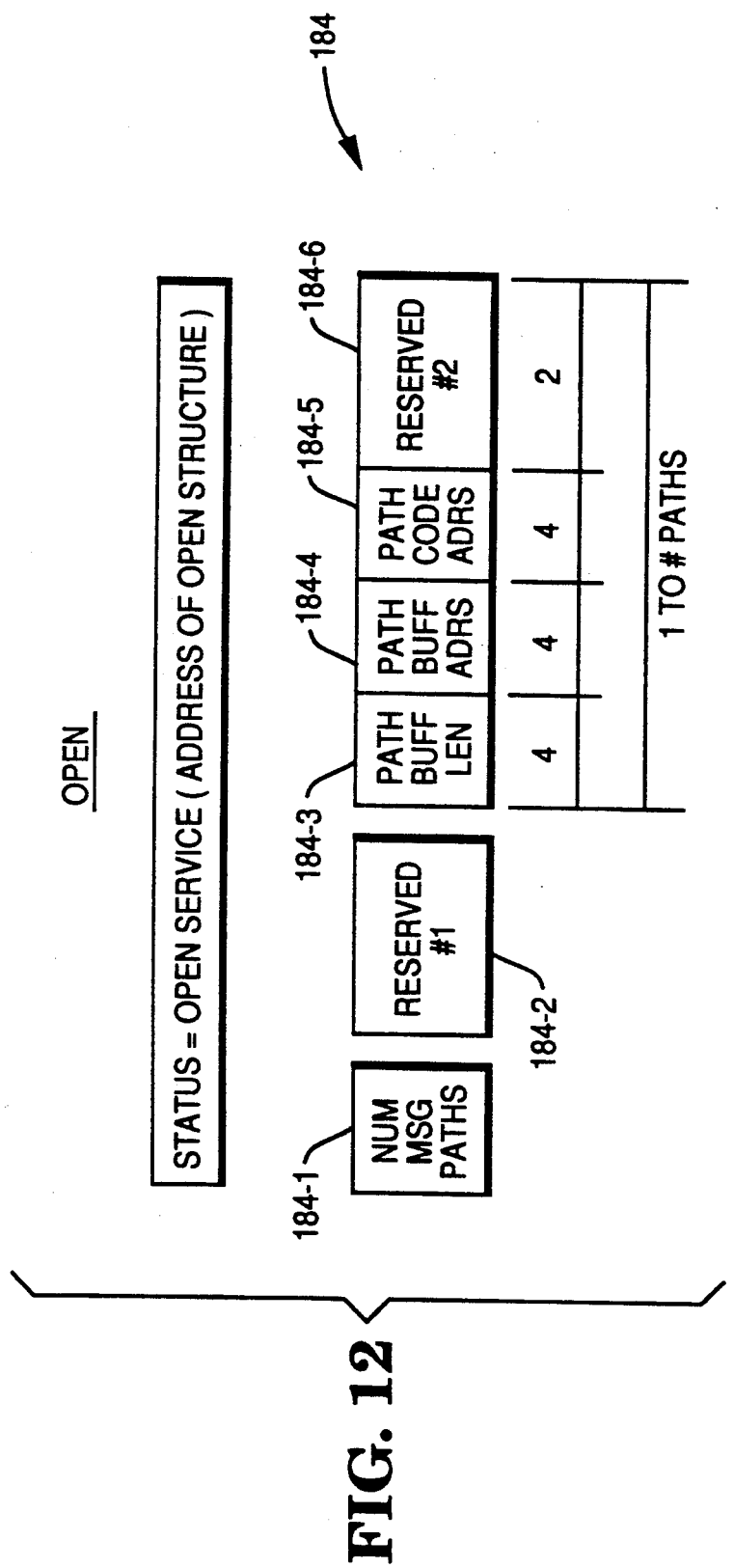
FIG. 12 is a schematic diagram showing a format of an Open service which is one of several services used in providing communication between the PC and the machine shown in FIG. 6.

FIG. 12 shows the structure 184 for the Open service. The following are some of the features of the Open service:

1. The Open service is used to open the MTLs 168 and 172 and the associated communications drivers (SCSI 128 and 134, respectively).

2. The Open service allows one to specify the number of message paths, the size of each path buffer for receiving messages, and the address of each path buffer.

3. The Open service also allows one to specify a routine to be performed each time a message is received by that path. This routine could be used to alert an application when a message is received by the path. This routine should be small and not have direct access to the associated MTL.

With regard to the Open service structure 184 shown in FIG. 12, the following definitions apply:

Block 184-1 (NUM MSG PATHS) relates to an unsigned Byte value which indicates the number of message paths between the PC 12 and the machine 10 which the Host Application wants available. Valid values are 1 through 8; all other values result in an error.

Block 184-2 (RESERVED #1) relates to an unsigned Byte value reserved for future use. For each path that is required, the following has to be specified:

Block 184-3 (PATH BUFF LEN). This relates to an unsigned Long value which specifies the length of the path buffer for this path. This value can range from 256 bytes to 65,536 bytes in the embodiment described.

Block 184-4 (PATH BUFF ADRS). This relates to an address value which specifies the address of the buffer for receiving messages. The buffers specified for each path are used only by the associated MTL. The Host application should not use these buffers for its own use because messages received by the paths will be lost.

Block 184-5 (PATH CODE ADRS). This relates to an Address value which specifies the address of a path routine. This routine is invoked each time a message is received by the path. Block 184-6 (RESERVED). This relates to an unsigned 2 Byte field which is reserved for future use.

The Send service is used to send a message to the machine 10. The MTL 168 takes the information provided in the Send service structure 186 shown in FIG. 13 and validates the information to make sure that what is being asked for can be provided. If the information is invalid, the appropriate status is returned to the Host Application. If the information is valid, the Send service creates the send message and sends the message to the communications driver (SCSI 170) for sending to the machine 10. Once the message has been sent, a return is made to the Host Application with a status indicating the Send was completed successfully. If the message cannot be sent, an error status is returned to the Host Application.

Figure 13:
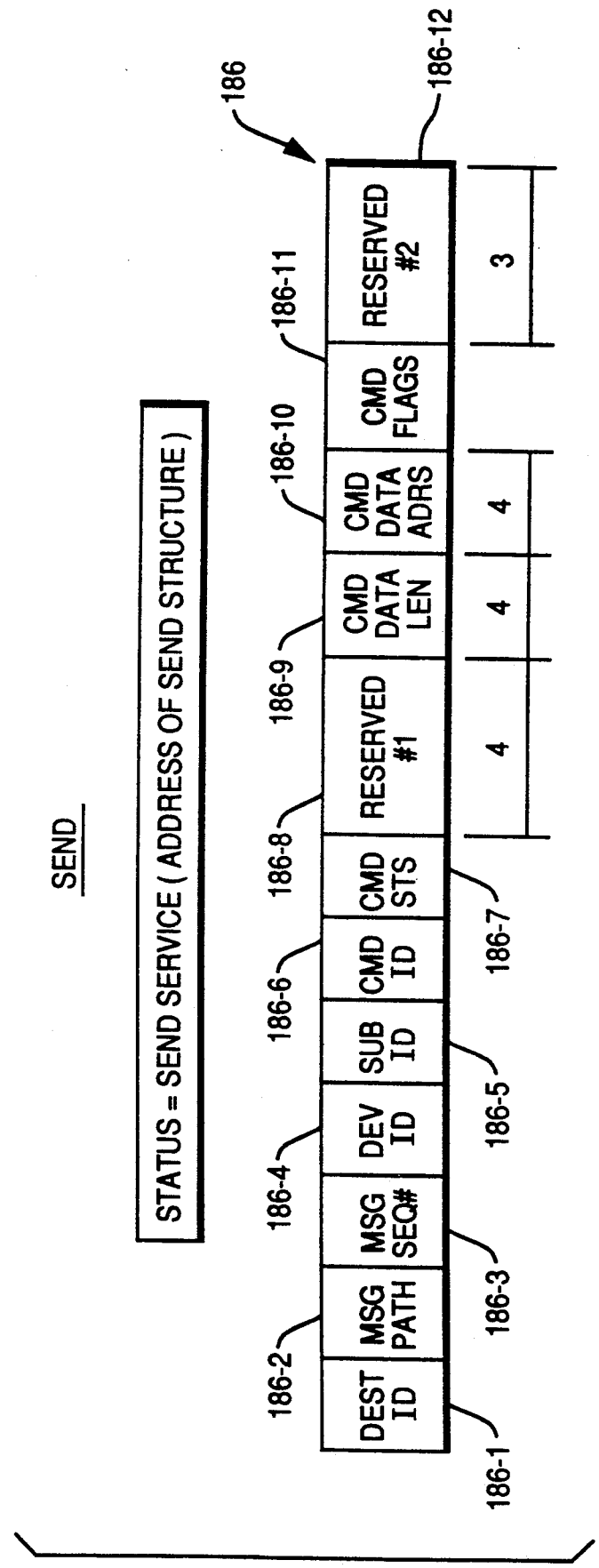
FIG. 13 is a schematic diagram showing a format of a Send service which is one of several services used in providing communication between the PC and the machine shown in FIG. 6.

With regard to the Send service structure 186 shown in FIG. 13, the following definitions apply:

Block 186-1 (DEST ID). This relates to an unsigned Word value which specifies a device on the communications link to which the message is to be sent. The device or value is determined by searching a Query table to find the machine 10. The Query table is an array of bytes which is located in the Host Application. The Query table is filled out by the Query Service. The offset into the Query table is the destination ID which is used when sending the message.

Block 186-2 (MSG PATH). This relates to an unsigned Byte value which specifies the path that the message is to be sent to. This value ranges from 1 to the number of paths specified in the Open service. Any other value results in an error status being returned.

Block 186-3 (MSG SEQ #). This relates to an unsigned Byte value which is used to identify a particular message. This value can range from 1 to 255. The number 0 is reserved for unsolicited messages from the machine 10.

Block 186-4 (DEV ID). This relates to an unsigned Byte value indicating the device to which the message is to be sent.

Block 186-5 (SUB ID). This relates to an unsigned Byte value indicating the subdevice to which the message is to be sent.

Block 186-6 (CMD ID). This relates to an unsigned Byte value indicating the type of command that needs to be performed by the specified device.

Block 186-7 (CMD STS). This relates to an unsigned Byte value indicating the status of the command being sent. In the Host Application, this field is always set to GOOD (00H). The machine 10 uses this field to indicate the state of the command that it has received and handled.

Block 186-8 (RESERVED #1). This relates to an unsigned 4 Byte value reserved for future use.

Block 186-9 (CMD DATA LEN). This relates to an unsigned Long value indicating the amount of data to be sent to the specified device. This value can range from 0 to 65,536 bytes in the embodiment described.

Block 186-10 (CMD DATA ADRS). This relates to an address value specifying the address of the buffer where the data to be sent is stored.

Block 186-11 (CMD FLAGS). This relates to an unsigned Byte value specifying information about the message. Each bit in this value has a particular meaning. If all the bits are off (0), then there is no extra information. The bits are numbered right to left starting at zero. The bits have the following meanings:

Bit 0: More to come bit. If set (1), the message is not complete and requires additional Sends to send the entire message.

Bit 1: Suppress completion bit. If set (1), the completion message is not returned for this message.

Bits 2-7: Reserved for future use. Block 186-12. (RESERVED #2). This relates to an unsigned 3 Byte field reserved for future use.

The Receive service is used by the Host Application to receive a message from a particular path. The MTL 168 takes the information provided in the Receive service structure 188 shown in FIG. 14 and validates the information to insure that the request can be handled. If the information is invalid, an error status is returned to the Host Application. If the information is valid, the Receive service then receives the data at the specified path.

Figure 14:
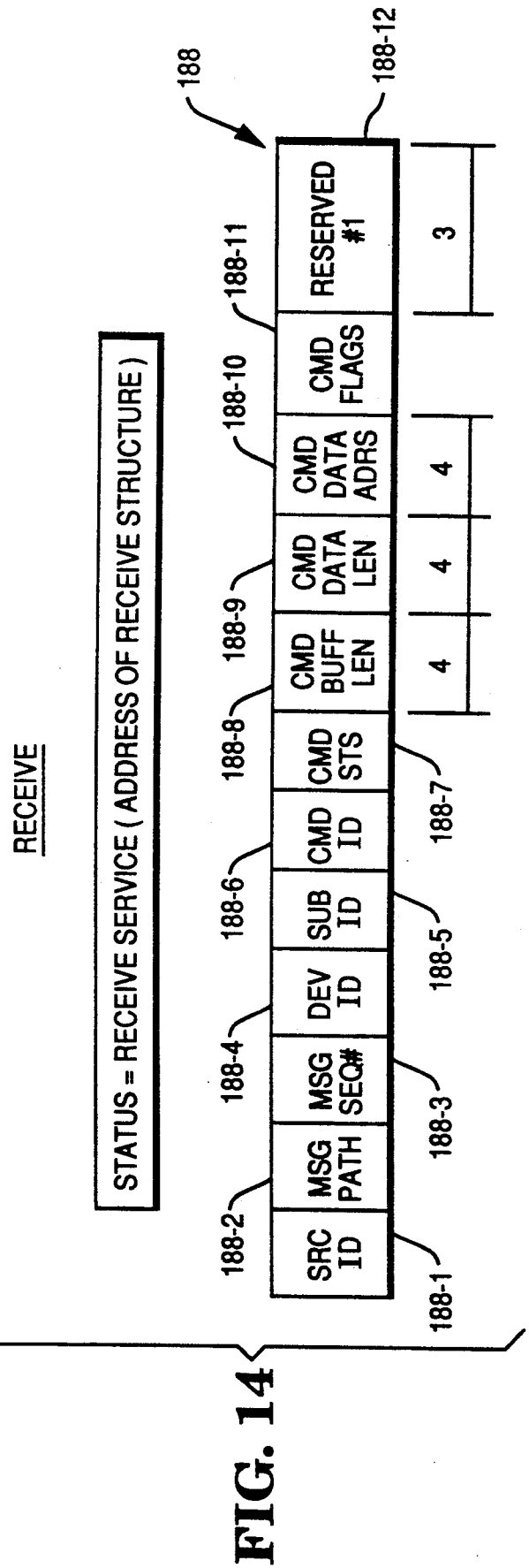
FIG. 14 is a schematic diagram showing a format of a Receive service which is one of several services used in providing communication between the PC and the machine shown in FIG. 6.

With regard to the Receive service structure 188 shown in FIG. 14, the following definitions apply:

Block 188-1 (SRC ID). This relates to an unsigned word which indicates which device on the communication link 156 sent the message. The value can be used as an offset into the Query table to determine whom the message is from. The SRC ID should be used as the DEST ID value for the Send service when responding to a received message.

Block 188-2 (MSG PATH). This relates to an unsigned Byte value which specifies the path that the message is to be received from. This value ranges from 0 to the number of paths specified in the Open service. Any other value results in an error status being returned. If the message path is set to 0, the MTL 168 searches all available paths until a path with a message is found. If a message is not currently available, a "Message Not Available" error status is returned to the Host Application.

Block 188-3 (MSG SEQ #). This relates to an unsigned Byte value which is used to identify a particular message; this value can range from 0 to 255. The MSG SEQ # is not set by the Host Application but is set by the MTL from the header information portion of a received message. The number 0 is reserved for unsolicited messages.

Block 188-4 (DEV ID). This relates to an unsigned Byte value indicating the device that the message is coming from.

Block 188-5 (SUB ID). This relates to an unsigned Byte indicating the subdevice that the message is coming from.

Block 188-6 (CMD ID). This relates to an unsigned Byte value indicating the type of command the current message contains. The CMD ID is not set by the Host Application; this field is set by the MTL only when a message is available.

Block 188-7 (CMD STS). This relates to an unsigned Byte value indicating the status of the command being sent.

Block 188-8 (CMD BUFF LEN). This relates to an unsigned Long value which indicates the size of the buffer into which the Host Application has available for receiving the message. This value can range from 0 to 32,500 bytes in the embodiment described. A data length of zero allows the Host Application to determine if a message is available without actually receiving it.

Block 188-9 (CMD DATA LEN). This relates to an unsigned Long value indicating the amount of data that has been placed into the Host Application buffer; this field is set by the MTL. This value can range from 0 to the size of the buffer specified by the Host Application, which in the embodiment described, is 65,536 bytes. The Host Application may need to perform multiple Receive services on the path if the entire message does not fit into the buffer specified.

Block 188-10 (CMD DATA ADRS). This relates to an address of the buffer where the message data is to be stored. This is set by the Host Application. Block 188-11 (CMD FLAGS). An unsigned Byte value specifying information about the message. Each bit in this value has a particular meaning. If all the bits are off (0), then there is no extra information. The bits are numbered right to left starting at zero. The bits have the following meanings:

Bit 0: More to come bit. If set (1), the message is not complete and requires additional Receives to receive the entire message across the communications link 156.

Bits 1 to 7: Reserved for future use. Block 188-12 (RESERVED #1). This relates to an unsigned 3 Byte field reserved for future use.

Figure 15:
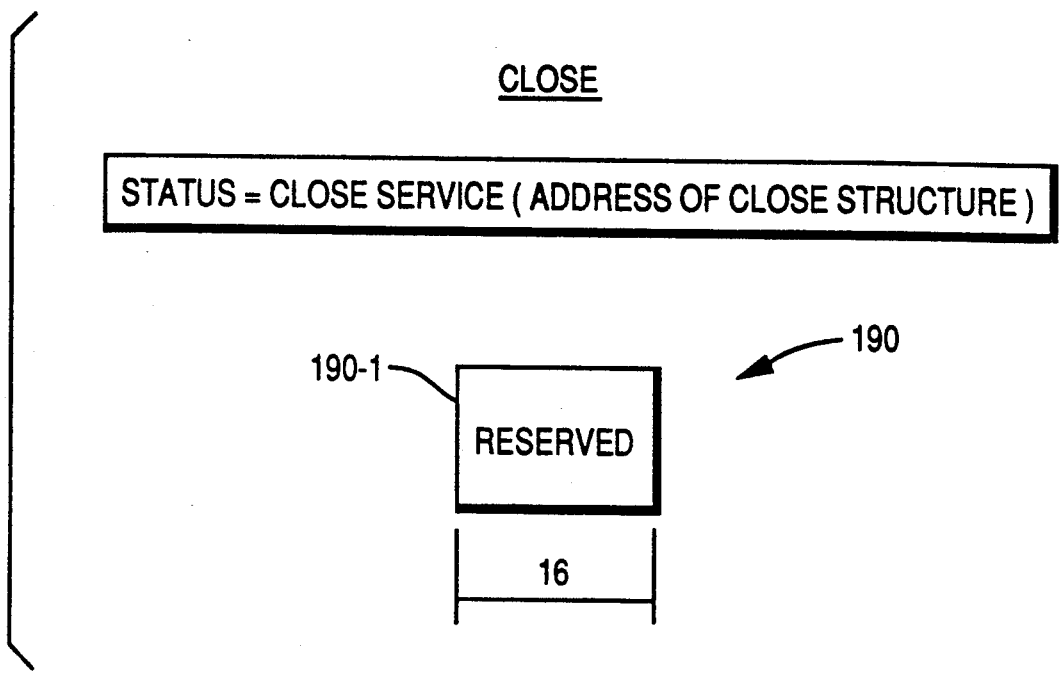
FIG. 15 is a schematic diagram showing a format of a Close service which is one of several services used in providing communication between the PC and the machine shown in FIG. 6.

The Close service is used to close from use the MTLs 168 and 172 and the associated communications drivers (SCSI 168 and 134, respectively). The Close service structure 190 is shown in FIG. 15 and is defined as follows:

Block 190-1 (RESERVED). This relates to an unsigned 16 Byte field reserved for future use.

Figure 16:
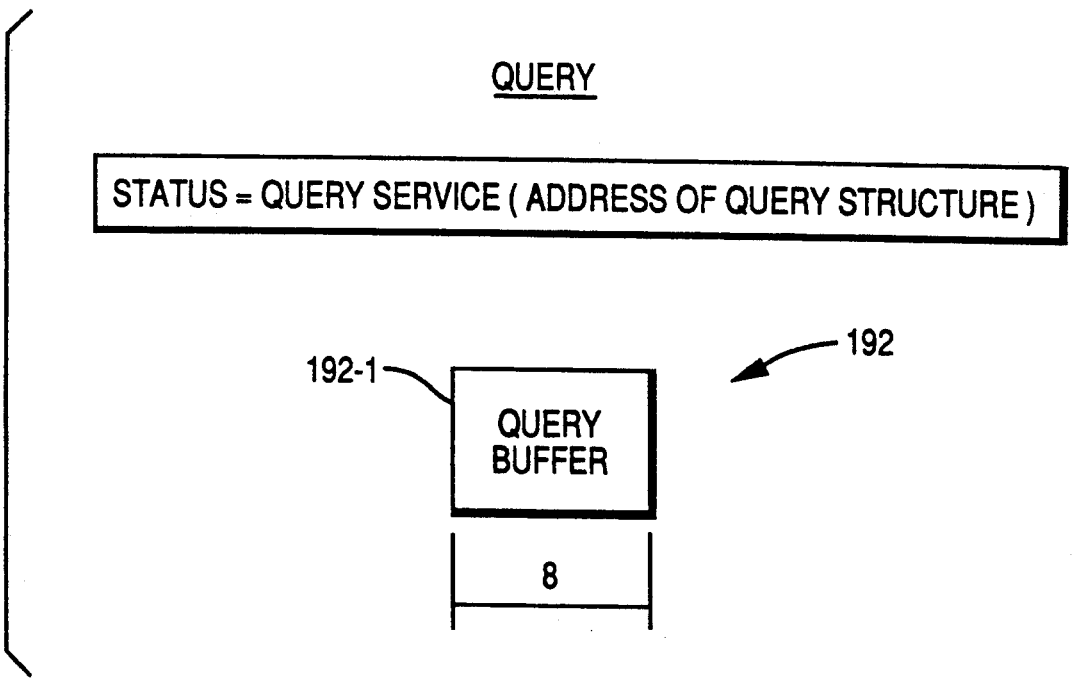
FIG. 16 is a schematic diagram showing a format of a Query service which is one of several services used in providing communication between the PC and the machine shown in FIG. 6.

The Query service is used by the Host Application to determine the destination IDs for the various devices on the communication link 156. These IDs are used in the Send service for sending messages to the various devices on the link 156, although only machine 10 is shown in this link in FIG. 5, for example. The Query service structure 190 is shown in FIG. 16 and is defined as follows:

Block 192-1 (DEVICE ID). This relates to an unsigned 8 Byte array. Each element in the array represents a device on the communications link 156. The offset into the array (starting at zero) is used as the Destination ID in the Send service. Each array element can have one of the following values:

* H - indicates the PC 12.
* U - indicates the machine 10.
* ? - indicates an unknown device.
* I - indicates the Host requesting the Query service.

The Host Application must perform a Query service before attempting to send messages to the MTL 168. If the Query service does not have the machine 10 specified, the Host Application could display a message asking to have the machine 10 powered on. The Host Application would continue to request Query service until a machine 10 were available. This would also be the same if the Host Application is also looking for another host PC similar to PC 12.

An unknown device (?) shown above, indicates that the device is not present or the device is present but is of an unknown type.

If the Host Application receives a message from a device, the value in the SRC ID field 188-1 of the Receive service structure 188 should be used as the Destination ID 186-1 of the Send service structure 186. After receiving a complete message, the Host Application can use the SRC ID 188-1 as an offset in the Query table to see from whom the message has come. If the Query table data at the Source ID offset is a "?" the Host Application should issue another Query command to determine who the device is which is sending the message. This device may have powered "on" after the Query service was performed. This enables the Host Application to determine the response required to handle the message.

The following List contains the constants, structure templates, public variable definitions, and function prototypes for the Service request routines.

```
/* CONSTANTS
**************************************************
#define    OPEN_SERVICE              0×01
   /* device service: open*/
#define    SEND_SERVICE              0×02
   /* device service: send*/
#define    RECEIVE_SERVICE           0×03
   /* device service: receive*/
#define    CLOSE_SERVICE             0×04
   /* device service: close*/
#define    QUERY_SERVICE             0×05
   /* device service: query*/
#define    MTL_OK                    0
   /* Successful MTL request*/
#define    MTL_NO_MESSAGE            1
   /* NO Message Available*/
#define    MTL_BAD_SERVICE          -1
   /* Illegal Service Request*/
#define    MTL_ALREADY_OPEN         -2
   /* THE MTL is already open*/
#define    MTL_INVALID_PATH         -3
   /* Invalid Path Number Specified*/
#define    MTL_BAD_BUFF_LEN         -4
   /* App specified more than G4K*/
#define    MTL_NOT_OPEN             -5
   /* MTL was not open when req*/
#define    MTL_BAD_BUFF_ADR         -6
   /* App specified a NULL POINTER*/
#define    MTL_BAD_DEST_ID          -7
   /* Dest id is illegal*/
#define    MTL_BAD_DATA_LEN         -8
   /* Too much data > 256K*/
#define    MTL_REQUEST_FAIL         -9
   /* The MTL request failed??*/
#define    MTL_TARGET_BUSY         -10
   /* Target MTL is busy*/
#define    MTL_BUSY                -11
   /* The MTL is receiving now*/
#define    MTL_RCV_ERROR           -12
   /* Error during receive*/
#define    MTL_NO_TARGET           -13
   /* No one to talk to*/
#define    MTL_NO_CAM              -14
   /* Cam Layer Not found*/
#define    MTL_SCSI_RESET          -15
   /* Scsi Bus was reset*/
#define    MTL_TARGET_TIMEOUT      -16
   /* Target did not take send*/
/* STRUCTURE TEMPLATES
**************************************
typedef struct
{
ULONG    pathBuffLen;
   /*path: buffer length*/
UCHAR FAR *pathBuffadr;
   /*path: buffer address*/
VOID (FAR *pathCodeAdr) ( );
```

-continued

```
   /*path: code address*/
UCHAR    reservedO2[0×O2];
   /*future expansion*/
} PATH_STRUCT;
   /*message path struct.*/
typedef struct
{
UCHAR    numMsgPaths;
   /* number of message paths*/
UCHAR    reservedO1[0×O1];
   /* future expansion
PATH_STRUCT path[0×OB];
   /* path structures*/
} OPEN_STRUCT;
   /* service structure: open*/
{
USHORT   destId;
   /* message destination*/
UCHAR    msgPath;
   /* message path*/
UCHAR    msgSeqNum;
   /* message sequence number*/
UCHAR    devId;
   /* device id*/
UCHAR    subId;
   /* subdevice id*/
UCHAR    cmdId;
   /* command id*/
UCHAR    cmdSts;
   /* command status*/
UCHAR    reservedO1[0×O4];
   /* future expansion*/
ULONG    cmdDataLen;
   /* command data length*/
UCHAR FAR *cmdDataAdr;
   /* command data address*/
UCHAR    cmdFlagFld;
   /* command flag field*/
UCHAR    reservedO2[0×O3];
   /* future expansion*/
} SEND_STRUCT;
   /* service structure: send*/
typedef struct
{
USHORT   srcId;
   /* message source*/
UCHAR    msgPath;
   /* message path*/
UCHAR    msgSeqNum;
   /* message sequence number*/
UCHAR    devId;
   /* device id*/
UCHAR    subId;
   /* subdevice id*/
UCHAR    cmdId;
   /* command id*/
UCHAR    cmdSts;
   /* command status*/
ULONG    cmdBuffLen;
   /* command buffer length*/
ULONG    cmdDataLen;
   /* command data length*/
UCHAR FAR *cmdDataAdr;
   /* command data address*/
UCHAR    cmdFlagFld;
   /* command flag field*/
UCHAR    reservedO1[0×O3];
   /* future expansion*/
} RECEIVE_STRUCT;
   /* service structure: receive*/
typedef struct
{
UCHAR    reservedO1[0×1O];
   /* future expansion*/
} CLOSE STRUCT;
   /* service structure: close*/
typedef struct
{
UCHAR    mtlId[0×OB];
   /* MTL IDs*/
} QUERY_STRUCT;
   /* service structure: query*/
```

-continued

```
/* PUBLIC VARIABLE DEFINITIONS
**********************************/
/* FUNCTION PROTOTYPES
********************************************/
EXTERN SINT   openService
  /* issue Open service*/
(
AUTO OPEN_STRUCT FAR * openStruct,
/* pointer to the open structure*/
AUTO SINT   OpenServiceValue,
/* Open service value*/
AUTO SINT   softwareInt
/* interrupt number to be used*/
);
EXTERN SINT SendService
/* issue Send service*/
(
AUTO SEND_STRUCT FAR *sendStruct,
/* pointer to the send structure*/
AUTO SINT SendServiceValue,
/* Send service value*/
AUTO SINT softwareInt
/* interrupt number to be used*/
);
EXTERN SINT   ReceiveService
  /* issue Receive comm service*/
(
AUTO RECEIVE STRUCT FAR * receiveStruct,
/* pointer to receive structure*/
AUTO SINT   ReceiveServiceValue,
/* Receive service value*/
AUTO SINT   softwareInt
/* interrupt number to be used*/
);
EXTERN SINTCloseService
/* issue Close comm link service*/
(
AUTO CLOSE STRUCT FAR *closeStruct.
/* pointer to the close structure*/
AUTO SINT   CloseServiceValue,
/* Close service value*/
AUTO SINT   softwareInt
/* interrupt number to be used*/
);
EXTERN SINTQueryService
/* issue Query service*/
(
AUTO QUERY_STRUCT FAR * queryStruct,
/* pointer to the query structure*/
AUTO SINT QueryServiceValue
/* Query service value*/
AUTO SINT   softwareInt
/* interrupt number to be used*/
);
```

One of the features of the machine 10 is that it was designed to have an architecture (FIG. 9) which enabled the Operating System Software 148 and running software associated with the image processing system 150, the track encoder system 152, the magnetic card reader system 153, and the encryption system 140 to be stored on the disc 154 of the PC 12. The Operating System Software 148 and the running software associated with the various systems mentioned in this paragraph are downloaded from the PC 12 to the operating system 148, and from the Operating System Software 148, the running software is then downloaded to the various systems mentioned.

What is claimed is:

1. A document processing machine for use with a computer having a keyboard, display, and control means for controlling the operation of said computer; said document processing machine being used for processing a document having a first side and a second side, said document processing machine comprising:

a document track having a first end and a second end with said first end being used for entering and exiting said document, and with said end being used for exiting said document;

programmable transport means for moving said document along first and second feeding directions within said document track, with said first and second directions being towards said second and first ends, respectively;

imaging means for imaging substantially all of one of said first and second sides at said document is moved along one of said first and second feeding directions in imaging relationship with said imaging means;

a printer positioned along said document track for printing on substantially all of one of said first and second sides of said document;

a control board operatively coupled to said transport means, imaging means, and printer, and input means for coupling said control board to said control means of said computer;

said control board comprising:

an image processing system controlling said imaging means;

a track encoder system controlling said transport means; and an operating system coupled to said image processing system and said track encoder system;

said operating system having storing means storing operating softward downloaded from said computer, and also having an imbedded processor executing said operating software.

2. A document processing machine for use with a computer having a keyboard, display, and control means for controlling the operation of said computer; said document processing machine being used for processing a document having a first side and a second side, said document processing machine comprising:

a document track having a first end and a second end with said first end being used for entering and exiting said document, and with said second end being used for exiting said document;

programmable transport means for moving said document along first and second feeding directions within said document track, with said first and second directions being towards said second and first ends, respectively;

imaging means for imaging substantially all of one of said first and second sides as said document is moved along one of said first and second feeding directions in imaging relationship with said imaging means;

a printer positioned along said document track for printing on substantially all of one of said first and second sides of said document;

a magnetic card reader;

an encrypter;

a control board operatively coupled to said transport means, imaging means, printer, magnetic card reader, and said encrypter; and input means for coupling said control board to said control means of said computer;

said control board comprising:

an image processing system controlling said imaging means;

a track encoder system controlling said transport means;

a magnetic card reader system controlling said magnetic reader;

an encryption system controlling said encrypter; and an operating system operatively coupled to said image processing system, said track encoder system, said image processing system, said magnetic card reader system, and said encryption system;

said operating system having storing means storing operating software downloaded from said computer, and also having an embedded processor executing said operating software.

3. A document processing machine for use with a computer having a keyboard, display, and control means for controlling the operation of said computer; said document processing machine being used for processing a document having a first side and a second side, said document processing machine comprising:

a document track having a first end and a second end with said first end being used for entering and exiting said document, and with said second end being used for exiting said document;

programmable transport means for moving said document along first and second feeding directions within said document track, with said first and second directions being towards said second and first ends, respectively;

imaging means for imaging one of said first and second sides as said document is moved along one of said first and second feeding directions in imaging relationship with said imaging means;

a printer positioned along said document track for printing on one of said first and second sides of said document;

a magnetic card reader;

an encrypter;

a control board operatively coupled to said transport means, imaging means, printer, magnetic card reader, and said encrypter; and input means for coupling said control board to said control means of said computer;

said control board comprising:

an image processing system controlling said imaging means;

a track encoder system controlling said transport means;

a magnetic card reader system controlling said magnetic reader;

an encryption system controlling said encrypter; and an operating system operatively coupled to said image processing system, said track encoder system, said imaging processing system, said magnetic card reader system, and said encryption system;

said operating system having storing means storing operating software downloaded from said computer, and also having an embedded processor executing said operating software;

said imaging processing system, said track encoder system, and said magnetic card reader system each have a RAM storing running software and an embedded processor for executing the associated said running software, with said running software being downloaded from said computer via said operating system.

4. The document processing machine as claimed in claim 3 in which aid input means includes a SCSI interface.

5. The document processing machine as claimed in claim 3 in which said RAM of said image processing system stores image data received from said imaging means; and in which said image processing system includes:

means for selecting zones of said image data; and means for performing optical character recognition on said zones of image data.

6. The document processing system as claimed in claim 5 in which said image data is stored in said RAM of said image processing system as gray level data and bi-level data.

7. The document processing machine as claimed in claim 6 in which said magnetic card reader generates customer data when a customer's card is read thereby, and said customer data is used by said control means for designating zones on said document for processing by said image processing system, said track encoder system, and said printer.

8. The document processing machine as claimed in claim 6 in which said printer is a printer for printing MICR data on the first side of said document.

9. A table top document processing machine for use with a computer having a keyboard, display, and control means for controlling the operation of said computer; said document processing machine being used for processing a document having a first side and a second side, said document processing machine comprising:

an image processing system including running software for imaging the first and second sides of said document moved in a document track;

a track encoder system including running software for printing graphics and alpha-numerics on said first and second sides and also for printing MICR data on said first side of said document;

a magnetic card reader system including running software and a magnetic reader for reading customer data from a card inserted in said magnetic reader;

an encryption system including running software for encryption of data processed by said machine; and an operating system including operating system software and a PC chip set for executing said operating system software;

said document processing machine having an architecture enabling said operating system software and said running software to be stored in said control means of said computer and to be downloaded to said operating system, with said running software being downloaded by said operating system to the associated image processing system, track encoder system, magnetic card reader system, and encryption system.

10. The document processing machine as claimed in claim 9 in which said track encoder system includes a document transport for moving the document bi-directionally within a document track included in the document processing machine.

11. The document processing machine as claimed in claim 10 in which said image processing system includes a first imager and a second imager for imaging said first and second sides of said document to generate image data therefor.

12. The document processing machine as claimed in claim 11 in which said running software associated with said image processing system performs optical character recognition on said image data.

13. The document processing machine as claimed in claim 12 in which said track encoder system includes first and second printers for printing on said first and second sides of said document, and also includes a MICR printer for printing on said first side of said document.

14. A document processing machine for use with a computer having a keyboard, display, and control means for controlling the operation of said computer, said document processing machine comprising:
- a document track having a first end and a second end;
- programmable transport means for moving a document having a front side and a rear side, with said programmable transport means moving said document along first and second feeding directions within said document track, and with said first and second directions being towards said second and first ends, respectively;
- first imaging means for imaging said front side and second imaging means for imaging said rear side as said document is moved along said feeding directions in imaging relationship with said first and second imaging means, respectively;
- a first printer positioned along said document track for printing on said front side;
- a second printer positioned along said document track for printing on said rear side;
- a third printer positioned along said document track for printing MICR data on said front side;
- a control board operatively coupled to said transport means, first and second imaging means, and first, second, and third printers; and
- input means for coupling said control board to said control means of said computer.

15. The document processing machine as claimed in claim 14 in which said first and second printers are text and graphics printers and said third printer is a MICR printer and in which said transport means includes a bi-directional motor for moving said document and also includes sensor means for outputting a control signal to said control board to enable said bi-directional motor to be energized only when the document is properly positioned in said first end of said document track.

16. The document processing machine as claimed in claim 14 in which each of said first and second printers comprises:
- a frame;
- a carriage mounted on said frame for movement in directions perpendicular to said first and second feeding directions;
- a print head mounted on said carriage; and
- means for moving said carriage with the print head thereon in said directions perpendicular to said first and second directions to enable said print head to print alpha-numerics and graphics on said document.

17. The document processing machine as claimed in claim 16 in which each said print head of said first and second printers is a replaceable ink jet print head.

18. The document processing machine as claimed in claim 17 in which said machine has a chassis and in which said document track, transport means, first and second imaging means and first, second, and third printers are mounted on said chassis, and in which said control board is mounted under said chassis.

19. The document processing machine as claimed in claim 10 in which said control board comprises:
- an image processing system controlling said first and second imaging means;
- a track encoder system controlling said programmable transport means; and
- an operating system coupled to said image processing system and said track encoder system and including operating system software and a PC chip set for executing said operating system software;
- said operating system software being downloaded from said control means of said computer.

20. A system comprising:
- a computer having a keyboard, display, and control means for controlling the operation of the computer; and
- a document processing machine for processing a document having a first side and a second side, said document processing machine comprising:
- a chassis having a topside and an underside;
- a document track having a first end and a second end with said first end being used for entering and exiting said document, and with said second end being used for exiting said document;
- programmable transport means for moving said document along first and second feeding directions within said document track, with said first and second directions being towards said second and first ends, respectively;
- imaging means for imaging substantially all of one of said first and second sides as said document is moved along one of said first and second feeding directions in imaging relationship with said imaging means;
- a printer positioned along said document track for printing on substantially all of one of said first and second sides of said document;
- a control board mounted on the underside of said chassis and operatively coupled to said transport means, imaging means, and printer; and
- input means coupling said control board to said control means of said computer;
- said programmable transport means including a bi-directional motor for moving said document and also including sensor means for outputting a control signal to said control board to enable said bi-directional motor to be energized only when the document is properly positioned in said first end of said document track;
- said printer comprising an ink jet printer;
- said control board comprising:
- an image processing means controlling said imaging means;
- a track encoder system controlling said transport means; and
- an operating system coupled to said image processing system and said track encoder system;
- said operating system including operating system software and a PC chip set running said operating system software, with said operating system software being downloaded from the control means of the computer.

21. A system comprising:
- a computer having a keyboard, display, and control means for controlling the operation of the computer; and
- a document processing machine for processing a document having a first side and a second side, said document processing machine comprising:
- a chassis having a topside and an underside;
- a document track having a first end and a second end with said first end being used for entering and exiting said document, and with said second end being used for exiting said document;

programmable transport means for moving said document along first and second feeding directions within said document track, with said first and second directions being towards said second and first ends, respectively;

imaging means for imaging substantially all of one of said first and second sides as said document is moved along one of said first and second feeding directions in imaging relationship with said imaging means;

a printer positioned along said document track for printing on substantially all of one of said first and second sides of said document;

a control board mounted on the underside of said chassis and operatively coupled to said transport means, imaging means, and printer; and input means coupling said control board to said control means of said computer;

said computer having storing means and in which said control means of said computer has editing means for editing image data from said imaging means to generate a graphic which may be stored in said storing means for use in printing said graphic on a said document by said printer;

said storing means including a plurality of graphics and said control means has means for selecting a graphic to be printed on said document by said printer;

said document being a financial document, and said graphic being an endorsement printed on said financial document; and said editing means in said control means of said computer including a Windows (TM) program, a Paint (TM) program, and a Clipboard (TM) storage associated with said Windows (TM) and Paint (198) programs.

22. A system comprising:

a computer having a keyboard, display, and control means for controlling the operation of the computer; and a document processing machine for processing a document having a first side and a second side, said document processing machine comprising:

a chassis having a topside and an underside;

a document track having a first end and a second end with said first end being used for entering and exiting said document, and with said second end being used for exiting said document;

programmable transport means for moving said document along first and second feeding directions within said document track, with said first and second directions being towards said second and first ends, respectively;

imaging means for imaging substantially all of one of aid first and second sides as said document is moved along one of said first and second feeding directions in imaging relationship with said imaging means;

a printer positioned along said document track for printing on substantially all of one of said first and second sides of said document;

a control board mounted on the underside of said chassis and operatively coupled to said transport means, imaging means, and printer; and input means coupling said control board to said control means of said computer;

said computer having storing means and in which said control means on said computer has editing means for editing image data from said imaging means to generate a graphic which may be stored in said storing means for use in printing said graphic on said document by said printer;

said storing means including a plurality of graphics and said control means has means for selecting a graphics to be printed on said document by said printer;

said document being a financial document, and said graphic being an endorsement printed on said financial document;

said programmable transport means including first drive rollers positioned along said document track for moving said document in said track and second drive rollers positioned along said track to position a document at said printer, with said first and second drive rollers being driven by said bi-directional motor.

23. A system comprising:

a computer having a keyboard, display, storing means for storing data, and control means for controlling the operation of the computer; and a document processing machine for processing a document having a front side and a rear side, said document processing machine comprising:

a chassis having a topside and an underside;

a document track having a first end and a second end with said first end being used for entering and exiting said document, and with said second end being used for exiting said document;

programmable transport means for moving said document along first and second feeding directions within said document track, with said first and second directions being towards said second and first ends, respectively;

first imaging means for imaging said front side and second imaging means for imaging said rear side as said document is moved along said feeding directions in imaging relationship with said first and second imaging means, respectively;

a first printer positioned along said document track for printing on said front side;

a second printer positioned along said document track for printing on said rear side;

a third printer positioned along said document track for printing MICR data on said front side;

a control board operatively coupled to said transport means, first and second imaging means, and first, second, and third printers; and input means for coupling said control board to said control means of said computer.

24. The system as claimed in claim 23 in which said programmable transport means includes a bi-directional motor for moving said document and also includes sensor means for outputting a control signal to said control board to enable said bi-directional motor to be energized only when the document is properly positioned in said first end of said document track.

25. The system as claimed in claim 24 in which each of said first and second printers comprises:

a frame mounted on the topside of said chassis;

a carriage mounted on said frame for movement in directions perpendicular to said first and second feeding directions;

a print head mounted on said carriage; and means for moving said carriage with the print head thereon in said directions perpendicular to said first and second directions to enable said print head to print alpha-numerics and graphics on said document.

26. The system as claimed in claim 25 in which each said print head of said first and second printers is a replaceable ink jet print head.

27. The system as claimed in claim 26 in which said document track, programmable transport means, first and second imaging means and first, second, and third printers are mounted on said topside of said chassis, and in which said control board is mounted on the underside of said chassis.

28. The system as claimed in claim 27 in which said control board comprises:
  an image processing system controlling said first and second imaging means;
  a track encoder system controlling said transport means; and
  an operating system coupled to said image processing system and said track encoder system;
  said operating system including operating system software and a PC chip set for executing said operating system software, with said operating system software being downloaded from said control means of said computer.

29. The system as claimed in claim 28 in which said first and second printers are graphics printers.

30. The system as claimed in claim 29 in which said first and second imaging means and said first and second printers have associated plug-in contacts to enable said imaging means and said printer to be mounted on the topside of said chassis with the associated plug-in contacts passing through said chassis to operatively engage said control board.

31. The system as claimed in claim 30 in which said computer has storing means and in which said control means of said computer has editing means for editing image data from said imaging means to generate a graphic which may be stored in said storing means for use in selectively printing said graphic on a said document by said first and second printers.

32. The system as claimed in claim 31 in which said third printer is a MICR printer.

33. The system as claimed in claim 32 in which said document is a financial document, and said graphic is an endorsement printed on said financial document.

34. The system as claimed in claim 33 in which said editing means in said control means of said computer includes a Windows(TM) program, a Paint(TM) program, and a Clipboard(TM) storage associated with said Windows(TM) and Paint(TM) programs.

35. The system as claimed in claim 31 in which said storing means includes a plurality of graphics and said control mans has means for selecting a graphic to be printed on said document by said first and second printers.

36. The system as claimed in claim 35 in which said document processing machine also includes a magnetic card reader coupled to said control board for entering data into said document processing machine.

37. A method of processing a document having first and second sides in a document processing machine (hereinafter referred to as machine) which is controlled by a computer having a keyboard, display, storing means for storing data, and control means for controlling the computer; said machine having a document track; programmable transport means for moving said document bi-directionally along opposed feeding directions in said document track; imaging means for imaging at least one of said first and second sides; at least one printer for printing on one of said first and second sides; and an operating system coupled to said control means, said programmable transport means, said imaging means, and said at least one printer; said method comprising the steps of:
  (a) loading in said control means programs to control the operation of the machine;
  (b) positioning a document to be processed in said document track;
  (c) inputting to said control means a control signal indicating the type of graphic to be printed on one of said first and second sides of said document; and
  (d) printing said graphic on said document by moving said document bidirectionally relationship with said printer located adjacent to said document track.

38. The method as claimed in claim 37 in which said printing step is effected while a print head in said printer is moved along a direction which is perpendicular to said feeding directions.

39. The method as claimed in claim 37 in which said step of inputting is effected by actuating a key on said keyboard.

40. The method as claimed in claim 37 in which said printing step is initiated only after said document is properly positioned in said document track in response to a favorable signal from alignment sensors positioned in said document track.

41. The method as claimed in claim 37 in which said printing is effected on said second side which is the rear side of said document.

42. The method as claimed in claim 37 further comprising the steps of:
  (e) imaging at least one of said first and second sides using said imaging means to generate an image of said document; and
  (f) storing said image in said storing means.

43. A method of processing a document having first and second sides in a document processing machine (hereinafter referred to as machine) which is controlled by a computer having a keyboard, display, storing means for storing data, and control means for controlling the computer; said machine having a document track; programmable transport means for moving said document bi-directionally along opposed feeding directions in said document track; imaging means for imaging at least one of aid first and second sides; at least one printer for printing on one of said first and second sides; and an operating system coupled to said control means, said programmable transport means, said imaging means, and said at least one printer; said method comprising the steps of:
  (a) loading in said control means programs to control the operation of the machine;
  (b) positioning a document to be processed in said document track;
  (c) inputting to said control means a control signal indicating the type of graphic to be printed on one of said first and second sides of said document; and
  (d) printing said graphic on said document by moving said document in printing relationship with said printer located adjacent to said document track;
  said printing step being effected while a print head in said printer is moved along a direction which is perpendicular to said feeding directions;
  said step of inputting being effected by actuating a key on said keyboard; and said step of inputting being effected by using said imaging means to read a code on said document to generate said control signal.

44. A method of endorsing a financial document having first and second sides in a document processing machine (hereinafter referred to as machine) which is controlled by a computer having a keyboard, display, storing means for storing data, and control means for controlling the computer; said machine having a document track; programmable transport means for moving said document bidirectionally along opposed feeding directions in said document track; imaging means for imaging at least one of said first and second sides; at least one printer for printing on one of said first and second sides; and an operating system coupled to said control means, said programmable transport means, said imaging means, and said at least one printer; said method comprising the steps of:

(a) loading in said control means programs to control the operation of the machine;
(b) storing endorsements to be selected in said storing means;
(c) positioning a document to be processed in said document track;
(d) inputting to said control means a selection signal indicating the type of endorsement to be selected from said storing means and printed on one of said first and second sides of said document; and
(e) printing said endorsement selected on said document by moving said document bi-directionally in printing relationship with said printer located adjacent to said document track.

45. The method as claimed in claim 44 in which said step of inputting is effected by actuating a key on said keyboard.

46. The method as claimed in claim 44 in which said step of inputting is effected by using said imaging means to read a code on said document to generate said selection signal.

47. A method of issuing a check having first and second sides in a document processing machine (hereinafter referred to as machine) which is controlled by a computer having a keyboard, display, storing means for storing image data and authorization data to be printed on said check, and control means for controlling the computer; said machine having a document track; programmable transport means for moving said document bi-directionally along opposed feeding directions in said document track; a magnetic card reader for reading customer account data for the check to be issued, at least one printer for printing image data on said check; a MICR printer for printing MICR data on said check; and an operating system coupled to said control means, said programmable transport means, said magnetic card reader, said MICR printer, and said at least one printer; said method comprising the steps of:

(a) loading in said control means programs to control the operation of the machine;
(b) positioning a sheet to form said check in said document track;
(c) selecting said image data and said authorization data to be printed on said sheet;
(d) entering on said keyboard the monetary amount of the check to be issued;
(e) moving said sheet in printing relationship with said at least one printer to print said image data on said sheet;
(f) moving said sheet in printing relationship with said MICR printer to print the monetary amount and authorization data on said sheet to complete the generation of said check.

48. A method of issuing a check having first and second sides in a document processing machine (hereinafter referred to as machine) which is controlled by a computer having a keyboard, display, storing means for storing image data and authorization data to be printed on said check, and control means for controlling the computer; said machine having a document track; programmable transport means for moving said document bi-directionally along opposed feeding directions in said document track; a magnetic card reader for reading customer account data for the check to be issued, at least one printer for printing image data on said check; a MICR printer for printing MICR data on said check; and an operating system coupled to said control means, said programmable transport means, said magnetic card reader, said MICR printer, and said at last one printer; said method comprising the steps of:

(a) loading in said control means programs to control the operation of the machine;
(b) positioning a sheet to form said check in said document track;
(c) selecting said image data and said authorization data t be printed on said sheet;
(d) entering on said keyboard the monetary amount of the check to be issued;
(e) moving said sheet in printing relationship with said at least one printer said image data on said sheet; and
(f) moving said sheet in printing relationship with said MICR printer to print the monetary amount and authorization data on said sheet to complete the generation of said check;
said selecting of authorization data being effected at least partially by reading customer account data through using said magnetic card reader.

49. A method of processing documents in a machine having:

an image processing system including associated running software for imaging at least one side of a said document moved in a document track in said machine;
a track encoder system including associated running software for printing graphics and text on at least one side of said document; and
an operating system including operating system software and a PC chip set for executing said operating system software; said method comprising the steps of:
(a) downloading said operating system software and said running software from an external PC to said operating system;
(b) downloading said associated running software to said image processing system and said track encoder system from said operating system; and
(c) using said operating system software and said running software to process said document in said machine.

50. A method of processing documents in a table-top machine having:

an image processing system including associated running software for imaging first and second sides of a said document moved in a document track in said table-top machine;

a track encoder system including associated running software for printing graphics and text on the first and second sides of said document and also for printing MICR data on said first side of said document;

a magnetic card reader system including associated running software and a magnetic reader for reading customer data from a card inserted in said mag reader;

an encryption system including associated running software for encryption of data processed by said machine; and an operating system including operating system software and a PC chip set for executing said operating system software;

said method comprising the steps of:

(a) downloading said operating system software and said running software from an external PC to said operating system;

(b) downloading said associated running software to said image processing system, said track encoder system, said magnetic card reader system, and said encryption system from said operating system; and (c) using said operating system software and said running software to process said document in said machine.

51. The method as claimed in claim 50 in which said said using step (c) comprises:

(cl) using said track encoder system for ejecting said document from either side of said document track.

52. The method as claimed in claim 50 in which said said using step (c) comprises:

(cl) using said image processing system for performing character recognition on image data generated by said image processing system.

53. The method as claimed in claim 50 in which said said using step (c) comprises:

(cl) using said track encoder system for printing a form.

54. The method as claimed in claim 50 in which said said using step (c) comprises:

(cl) using said track encoder system for issuing a check.

55. The method as claimed in claim 50 in which said said using step (c) comprises:

(cl) using said track encoder system for issuing a receipt-type document.

56. The method as claimed in claim 50 in which said said using step (c) comprises:

(cl) using said image processing system for viewing zones of image data generated by said image processing system.

57. The method as claimed in claim 50 in which said using step (c) comprises:

(cl) using said image processing system for performing character recognition on image data generated for a document by said image processing system, with said step of performing character recognition being effected by selecting a zone of said image data, with said zone being anywhere on said document.

* * * * *

UNITED STATES PATENT AND TRADEMARK OFFICE
CERTIFICATE OF CORRECTION

PATENT NO. : 5,274,567

DATED : December 28, 1993

INVENTOR(S) : Fredrik L.N. Kallin et al.

It is certified that error appears in the above-identified patent and that said Letters Patent is hereby corrected as shown below:

Column 24, line 11, "at" should be --as--.

Column 24, line 30, "softward" should be --software--.

Column 29, line 55, delete "aid" and insert --said--

Column 29, line 35, delete "198" and insert --TM--.

Column 32, line 15, after "bidirectionally" insert --in printing--.

Column 31, line 53, "mans" should be --means-- first occurrence.

Column 34, line 31, after "printer" insert --to print--.

Column 34, line 27, delete "t" and insert --to--.

Column 34, line 20, "last" should be --least--.

Signed and Sealed this

Twenty-sixth Day of July, 1994

Attest:

BRUCE LEHMAN

*Attesting Officer*  *Commissioner of Patents and Trademarks*